United States Patent
Li et al.

(10) Patent No.: US 12,387,690 B2
(45) Date of Patent: Aug. 12, 2025

(54) DISPLAY CONTENT UPDATING METHOD AND DEVICE, AND MEDIUM

(71) Applicant: HANSHOW TECHNOLOGY CO., LTD., Zhejiang (CN)

(72) Inventors: Yanchen Li, Zhejiang (CN); Jianguo Zhao, Zhejiang (CN); Shiguo Hou, Zhejiang (CN)

(73) Assignee: HANSHOW TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/044,944

(22) Filed: Feb. 4, 2025

(65) Prior Publication Data

US 2025/0182711 A1    Jun. 5, 2025

Related U.S. Application Data

(63) Continuation of application No. 18/678,947, filed on May 30, 2024.

(30) Foreign Application Priority Data

Sep. 22, 2023   (CN) .......................... 202311226625.5

(51) Int. Cl.
G09G 3/34          (2006.01)
(52) U.S. Cl.
CPC ..... *G09G 3/344* (2013.01); *G09G 2320/0686* (2013.01); *G09G 2340/0435* (2013.01)
(58) Field of Classification Search
CPC .................................................... G09G 3/344
See application file for complete search history.

(56) References Cited

U.S. PATENT DOCUMENTS

2006/0050050 A1    3/2006   Zhou et al.
2007/0031031 A1    2/2007   Hirano et al.
(Continued)

FOREIGN PATENT DOCUMENTS

CN           106970498 A     7/2017
CN           108962153 A    12/2018
(Continued)

OTHER PUBLICATIONS

Austrailian Patent Office Action for Application No. 2024213129 dated Sep. 17, 2024 (4 pages).
(Continued)

*Primary Examiner* — Gustavo Polo
(74) *Attorney, Agent, or Firm* — Michael Best & Friedrich LLP

(57) ABSTRACT

Provided are a display content updating method and apparatus, a device, and a medium, relating to the field of screen display technologies. The display content updating method includes: acquiring a color region included in a multi-color image and a color type corresponding to the color region; converting the multi-color image into multiple pieces of refresh image data and refresh instructions corresponding to the multiple pieces of refresh image data according to positions and color types of color regions in the multi-color image, where different refresh instructions are executed asynchronously; and sending the refresh instructions and the multiple pieces of refresh image data to a controller of an electronic paper screen so that the controller refreshes the display content of the electronic paper screen based on the refresh instructions and the corresponding multiple pieces of refresh image data.

20 Claims, 12 Drawing Sheets

(56) References Cited

U.S. PATENT DOCUMENTS

2012/0268500 A1  10/2012  Chang et al.
2022/0068229 A1  3/2022  Sim et al.

FOREIGN PATENT DOCUMENTS

| CN | 109671400 A | 4/2019 |
|---|---|---|
| CN | 111951738 A | 11/2020 |
| CN | 113837181 A | 12/2021 |
| CN | 114023272 A | 2/2022 |
| CN | 114331796 A | 4/2022 |
| CN | 114639358 A | 6/2022 |
| CN | 116386550 A | 7/2023 |
| CN | 116994532 A | 11/2023 |
| JP | 2011248357 A | 12/2011 |
| JP | 2012181507 A | 9/2012 |
| JP | 2012220693 A | 11/2012 |
| JP | 2015158530 A | 9/2015 |
| JP | 2016075960 A | 5/2016 |
| JP | 2020173451 A | 10/2020 |
| JP | 2023546718 A | 11/2023 |

OTHER PUBLICATIONS

European Patent Office Extended Search Report for Application No. 24173483.9 dated Oct. 1, 2024 (11 pages).
Japanese Patent Office Decision to Grant for Application No. 2024089942 dated Jul. 25, 2024 (5 pages including English machine translation).
Japanese Patent Notice of Reasons for Refusal for Application No. 2024089942 dated Jun. 18, 2024 (7 pages including English machine translation).
Canadian Patent Office Action for Application No. 3238056 dated Aug. 26, 2024 (5 pages).
New Zealand Patent Office Action for Application No. 813923 dated Oct. 4, 2024 (2 pages).
Office Action issued in Chinese Application No. 202311226625.5, dated Nov. 9, 2023.

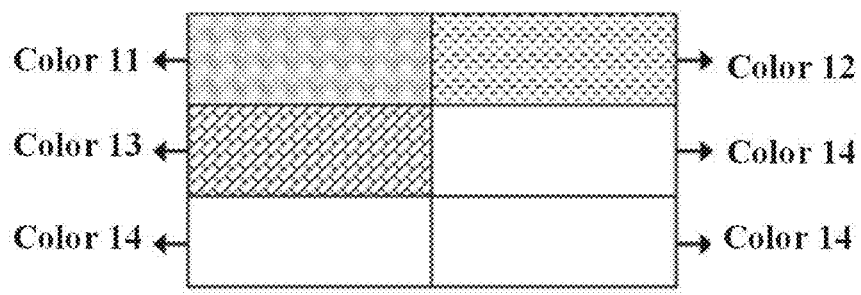
FIG. 6A
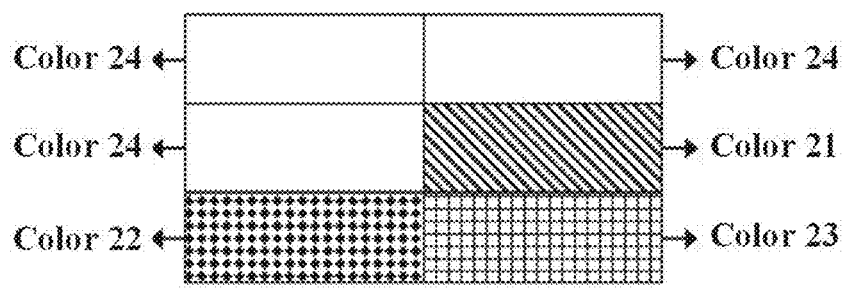
FIG. 6B
FIG. 7

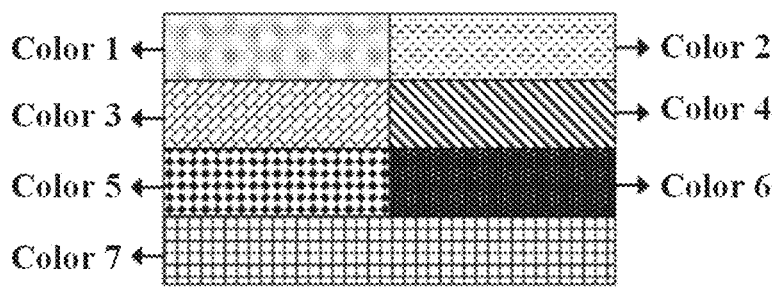
FIG. 8
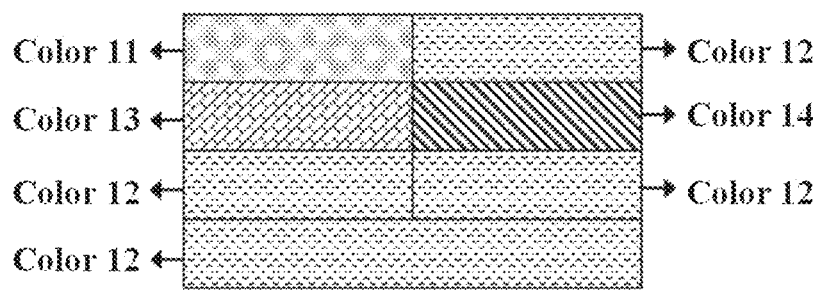
FIG. 9
FIG. 10A

FIG. 11B

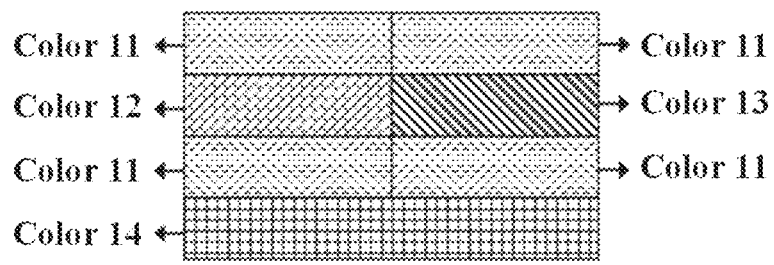
FIG. 13
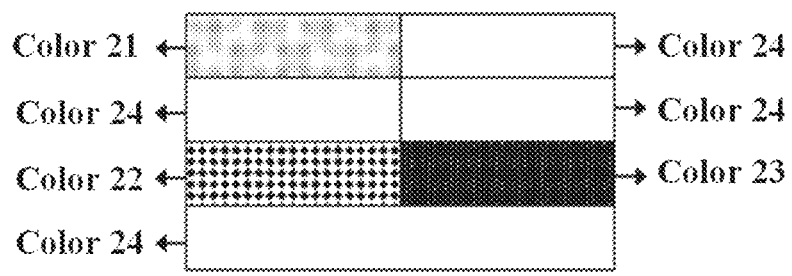
FIG. 14A
FIG. 14B

DISPLAY CONTENT UPDATING METHOD AND DEVICE, AND MEDIUM

CROSS-REFERENCE TO RELATED APPLICATIONS

This is a Continuation Application of U.S. patent application Ser. No. 18/678,947, filed May 30, 2024, which claims priority to Chinese patent application No. 202311226625.5 filed with the CNIPA on Sep. 22, 2023, disclosures of which are incorporated herein by reference in their entireties.

TECHNICAL FIELD

The present disclosure relates to the field of screen display technologies and, in particular, to a display content updating method and apparatus, a device, and a medium.

BACKGROUND

An electronic paper screen is a display screen made using electrophoretic display technology. A driver integrated circuit (IC) applies drive voltages to pixels through a control circuit on a thin-film transistor (TFT) substrate, thereby driving colored particles in an electronic paper film to move so that the effect of displaying images is achieved. As a reflective display screen, the electronic paper screen may maintain the updated image for a long time without continuous refresh, so the power consumption is relatively low. Due to many features such as low power consumption, a wide viewing angle, high contrast, and eye protection, the electronic paper screens are applied in many fields such as electronic paper screens, e-books, and billboards.

For the electronic paper screen, 1) from the perspective of the display effect, the more colors the electronic paper film rends, the better the electronic paper screen is; 2) from the perspective of cost, the fewer bits supported by the driver IC, the cheaper the electronic paper screen is. Currently, a four-color electronic paper film equipped with a 2-bit driver IC just rends up to four colors. To rend greater than four and less than or equal to eight colors, the four-color electronic paper film must be equipped with a 3-bit driver IC, which costs much higher than the 2-bit driver IC.

SUMMARY

The present disclosure provides a display content updating method and apparatus, a device, and a medium, so as to increase the display content updating speed and reduce the cost of displaying diverse content.

An embodiment of the present disclosure provides a display content updating method. The method includes the steps described below.

A color region included in a multi-color image and a color type corresponding to the color region are acquired.

The multi-color image is converted into multiple pieces of refresh image data and refresh instructions corresponding to the multiple pieces of refresh image data according to positions and color types of color regions in the multi-color image, where different refresh instructions are executed asynchronously.

The refresh instructions and the multiple pieces of refresh image data are sent to a controller of an electronic paper screen so that the controller refreshes the display content of the electronic paper screen based on the refresh instructions and the corresponding multiple pieces of refresh image data.

An embodiment of the present disclosure further provides a display content updating apparatus. The apparatus includes a color region acquisition module, an image conversion module, and an image data control module.

The color region acquisition module is configured to acquire a color region included in a multi-color image and a color type corresponding to the color region.

The image conversion module is configured to, convert the multi-color image into multiple pieces of refresh image data and refresh instructions corresponding to the multiple pieces of refresh image data according to positions and color types of color regions in the multi-color image, where different refresh instructions are executed asynchronously.

The image data control module is configured to send the refresh instructions and the multiple pieces of refresh image data to a controller of an electronic paper screen so that the controller refreshes the display content of the electronic paper screen based on the refresh instructions and the corresponding multiple pieces of refresh image data.

An embodiment of the present disclosure further provides a display content updating device. The device includes at least one processor and a memory communicatively connected to the at least one processor.

The memory stores a computer program executable by the at least one processor to enable the at least one processor to perform the display content updating method according to any embodiment of the present disclosure.

An embodiment of the present disclosure further provides a computer-readable storage medium. The computer-readable storage medium is configured to store a computer instruction which, when executed by a processor, causes the processor to perform the display content updating method according to any embodiment of the present disclosure.

In the technical solutions of the embodiment of the present disclosure, a color region included in a multi-color image and a color type corresponding to the color region are acquired, facilitating targeted operations on different color regions and color types corresponding to different color regions; the multi-color image is converted into multiple pieces of refresh image data and refresh instructions corresponding to the multiple pieces of refresh image data according to positions and color types of color regions in the multi-color image, where different refresh instructions are executed asynchronously; corresponding refresh instructions are executed for different refresh image data, improving the accuracy of targeted operations on the refresh image data; the refresh instructions and the multiple pieces of refresh image data are sent to a controller of an electronic paper screen so that the controller refreshes the display content of the electronic paper screen based on the refresh instructions and the corresponding multiple pieces of refresh image data, implementing that the controller uses targeted refresh instructions for the refresh image data and performs corresponding operations on the electronic paper screen according to the refresh instructions, thereby improving the efficiency and accuracy of image data processing.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate the technical solutions of the embodiment of the present disclosure more clearly, the drawings used in the description of the embodiment are described briefly hereinafter. Apparently, the drawings described below illustrate merely part of the embodiments of the present disclosure. Those of ordinary skill in the art may obtain other drawings based on these drawings on the premise that no creative work is done.

FIG. 6A is a schematic view of an image of a first color group corresponding to a six-color image according to embodiment two of the present disclosure;

FIG. 6B is a schematic view of an image of a second color group corresponding to a six-color image according to embodiment two of the present disclosure;

FIG. 7 is a schematic diagram of a first driving waveform corresponding to a first color group of a six-color image according to embodiment two of the present disclosure;

FIG. 8 is a schematic diagram of a second driving waveform corresponding to a second color group of a six-color image according to embodiment two of the present disclosure;

FIG. 9 is a schematic view of a seven-color image according to embodiment two of the present disclosure;

FIG. 10A is a schematic view of an image of a first color group corresponding to a seven-color image according to embodiment two of the present disclosure;

FIG. 11B is a schematic diagram of a second driving waveform corresponding to a second color group of a seven-color image according to embodiment two of the present disclosure;

FIG. 13 is a schematic diagram of a driving waveform for a four-color electronic paper screen refresh according to embodiment three of the present disclosure;

FIG. 14A is a schematic view of an image of a first color group corresponding to a seven-color image according to embodiment three of the present disclosure;

FIG. 14B is a schematic view of an image of a second color group corresponding to a seven-color image according to embodiment three of the present disclosure;

FIG. 15A is a schematic diagram of a first driving waveform corresponding to a first refresh instruction of a seven-color image according to embodiment three of the present disclosure;

FIG. 15B is a schematic diagram of a second driving waveform corresponding to a second refresh instruction of a seven-color image according to embodiment three of the present disclosure;

DETAILED DESCRIPTION

For a better understanding of the solutions of the present disclosure by those skilled in the art, the technical solutions in the embodiments of the present disclosure are described clearly and completely below in conjunction with the drawings in the embodiments of the present disclosure. Apparently, the embodiments described below are merely part, not all, of the embodiments of the present disclosure. Based on the embodiments of the present disclosure, all other embodiments obtained by those of ordinary skill in the art on the premise that no creative work is done are within the scope of the present disclosure.

It is to be noted that the terms such as "first" and "second" in the description, claims, and preceding accompanying drawings of the present disclosure are used for distinguishing between similar objects and are not necessarily used for describing a particular order or sequence. It is to be understood that the data used in this manner is interchangeable in appropriate cases so that the embodiments of the present disclosure described herein may be implemented in a sequence not illustrated or described herein. In addition, the terms such as "comprising" and "including" and any other variations thereof are intended to encompass a non-exclusive inclusion. For example, a process, method, system, product, or device that includes a series of steps or units not only includes the expressly listed steps or units but may also include other steps or units that are not expressly listed or are inherent to such process, method, product, or device.

In the technical solutions of the embodiments of the present disclosure, the acquisition, storage, and application of the multi-color image involved are in compliance with relevant laws and regulations and do not violate the public order and good customs.

Embodiment One

Figure 1:
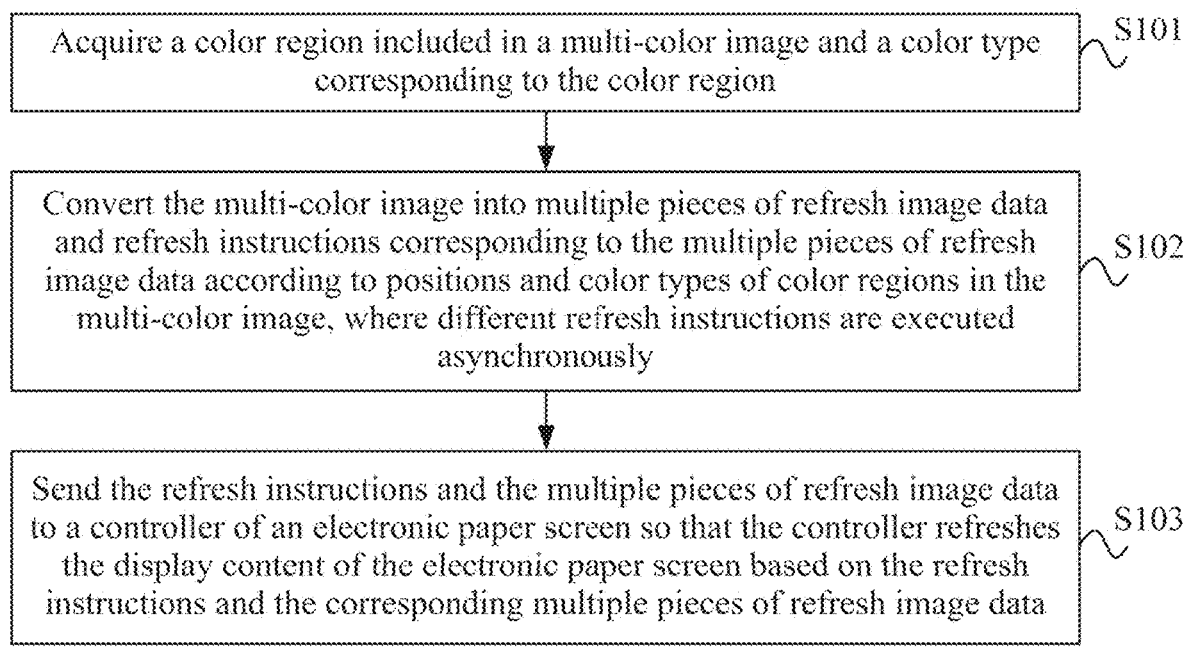
FIG. 1 is a flowchart of a display content updating method according to embodiment one of the present disclosure.

FIG. 1 is a flowchart of a display content updating method according to embodiment one of the present disclosure. The embodiment of the present disclosure may be applied to the case of updating the display content of the electronic paper screen. This method may be performed by a display content updating apparatus. The display content updating apparatus may be implemented in the form of hardware and/or software. The display content updating apparatus may be configured in an electronic device, and the electronic device may be a server device or a client device, which is not limited in the embodiment of the present disclosure.

Referring to the display content updating method shown in FIG. 1, the method includes the steps described below.

In S101, a color region included in a multi-color image and a color type corresponding to the color region are acquired.

In this embodiment, the multi-color image is an image that consists of multiple colors. The color region may refer to a region filled with the same type of color. The color region may be understood as a set of the positions of all pixels with the same color in the image. The color type is used for distinguishing between different colors, and the color type may include at least one of the following: orange, yellow, green, blue, purple, red, black, white, or the like. Furthermore, each color type may be further subdivided. For example, orange may be divided into light orange and dark orange, and light orange and dark orange are different color types. The color types of adjacent color regions are different. The color types of non-adjacent color regions may be the same or different.

In an embodiment, through an image data processing operation on the multi-color image, the color regions included in the multi-color image, the positions of the color regions, and the color type of each color region are identified.

In an example, the image data processing operation manner includes, but is not limited to, direct manual input, camera capture, image uploading, image detection, the neural network, the traditional method, or the like, which is not limited in this embodiment.

In S102, the multi-color image is converted into multiple pieces of refresh image data and refresh instructions corresponding to the multiple pieces of refresh image data according to positions and color types of color regions in the multi-color image, where different refresh instructions are executed asynchronously.

In this embodiment, the refresh image data may refer to the refreshed color region and the color type that needs to be refreshed during a certain refresh. In an embodiment, the refresh image data may be the image data obtained after the multi-color image is encoded using an image processing tool according to a color encoding rule. The refresh instruction is an operation to be performed on multiple pieces of refresh image data of the multi-color image as needed. One refresh instruction represents one refresh, where at least one refresh instruction is provided. The refresh instruction corresponds to the refresh image data. The refresh image data corresponding to the refresh instruction may refer to the color region that needs to be refreshed in a refresh round of the refresh instruction and the color type that needs to be refreshed in the color region. It is to be noted that the refresh of the electronic paper screen may be understood as the color development of the electronic paper screen.

In an embodiment, according to the color regions of the multi-color image and the color type results corresponding to the color regions, the multi-color image is converted into multiple pieces of refresh image data and the refresh instructions corresponding to the multiple pieces of refresh image data, and different refresh instructions are executed asynchronously, where asynchronous execution means not executing simultaneously. One refresh instruction corresponds to one refresh process. One refresh instruction is used for refreshing the color development of the electronic paper screen based on one piece of refresh image data. Multiple refresh instructions represent multiple refresh processes, and only one piece of refresh image data is used for refresh in one refresh process. Two refresh instructions are not executed simultaneously in one refresh process. If two refresh instructions need to be executed for the multi-color image, when a first refresh instruction is executed, only the first refresh instruction is executed in this case, and no other refresh instruction is executed; when a second refresh instruction is executed, only the second refresh instruction is executed in this case, and no other refresh instruction is executed.

Figure 2:
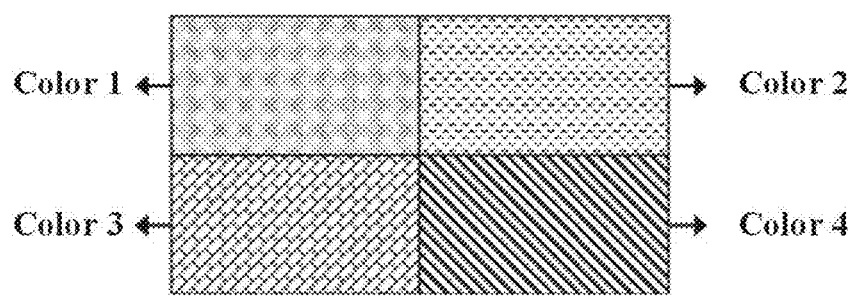
FIG. 2 is a schematic view of a four-color image according to embodiment one of the present disclosure.

In an example, as shown in FIG. 2, a schematic view of a four-color image is shown. Different colors are distinguished by different fill patterns. This image is the target image to be updated and displayed on a four-color electronic paper screen. Each color in the four-color image corresponds to a region in the image. This region is a set of the positions of all pixels with the same color in the image. For ease of description, shapes of four regions corresponding to the four colors in the schematic view are rectangles. However, in practical application, the shapes of the four regions may be any shape, such as circles, polygons, or irregular shapes, which is not limited here. As can be seen from the figure, the image includes four colors: color 1, color 2, color 3, and color 4. The preceding four colors correspond to the colors of particles in the electronic paper film used in the electronic paper screen. The electronic paper film, as the display unit of the electronic paper screen, is used for displaying the image actually seen by the human eye. The black, white, yellow, and red electronic paper screen is used as an example, where color 1 is black, color 2 is white, color 3 is yellow, and color 4 is red. If the image includes four colors, the electronic paper screen uses a four-color electronic paper film and a 2-bit driver IC. The four-color electronic paper film includes four types of colored particles, and the colors of the four types of colored particles correspond to the four colors of the four-color image. Then the four colors require four groups of codes, which corresponds to four groups of digital codes 00, 01, 10, and 11 of the 2-bit driver IC. For ease of description, the following settings are made: color 1 corresponds to region 1 and is coded as 00; color 2 corresponds to region 2 and is coded as 01; color 3 corresponds to region 3 and is coded as 10; and color 4 corresponds to region 4 and is coded as 11. The four-color electronic paper screen of black, white, yellow, and red is used as an example, where color 1 is black, corresponds to region 1, and is coded as 00; color 2 is white, corresponds to region 2, and is coded as 01; color 3 is yellow, corresponds to region 3, and is coded as 10; and color 4 is red, corresponds to region 4, and is coded as 11. According to the preceding color encoding rule, the image processing tool may perform data processing on the four-color image that needs to be displayed and process the four-color image into multiple pieces of refresh image data and corresponding refresh instructions. For example, the refresh image data corresponding to the refresh instruction for the first refresh is region 1 and region 2, which corresponds to the code 00 and code 01, respectively. The refresh image data corresponding to the refresh instruction for the second refresh is region 3 and region 4, which correspond to the code 10 and code 11, respectively. Moreover, the first refresh and the second refresh are executed asynchronously. When the first refresh is executed, only the refresh instruction for the first refresh is executed; and when the second refresh is executed, only the refresh instruction for the second refresh is executed.

In S103, the refresh instructions and the multiple pieces of refresh image data are sent to a controller of an electronic paper screen so that the controller refreshes the display content of the electronic paper screen based on the refresh instructions and the corresponding multiple pieces of refresh image data.

In this embodiment, the refresh instructions may be divided according to refresh regions and include refresh instructions for the global refresh and refresh instructions for the partial refresh. Global refresh: all pixels on the screen are refreshed, and the refresh process includes three stages: charge balance, activation, and color rendering. Partial refresh: some pixels on the screen are refreshed; and the refresh process includes three stages: charge balance, activation, and color rendering or only two stages: charge balance and color rendering, where the partial refresh that includes only two stages, charge balance and color rendering, is a partial fast refresh. The partial fast refresh includes only two stages, charge balance and color rendering, omitting the activation stage and improving the time efficiency of refresh. The partial refresh is divided into the partial refresh for a rectangular region and the partial refresh for any position. Partial refresh for a rectangular region: only the pixels in a specific rectangular region of the screen are refreshed; and the refresh process includes three stages: charge balance, activation, and color rendering or only two stages: charge balance and color rendering, where the partial refresh for a rectangular region that includes only two stages, charge balance and color rendering, is the partial fast refresh for a rectangular region. Partial refresh for any position: only the pixels on the screen that need to be updated to a specific color are refreshed; the refresh region is a set of pixels that need to be updated to the specific color; the refresh region may be of any shape; and the refresh process includes three stages: charge balance, activation, and color rendering or only two stages: charge balance and color rendering, where the partial refresh for any position that includes only two stages, charge balance and color rendering, is the partial fast refresh for any position.

In an embodiment, the controller of the electronic paper screen acquires the refresh instructions and the refresh image data, refreshes the electronic paper screen according to the acquired refresh instructions and refresh image data, and controls and displays the display content of the electronic paper screen.

If a target image refreshed on the electronic paper screen is a four-color image, the refresh image is consistent with the target image and is a four-color image, the number of refreshes is one refresh, the refresh type is the global refresh, one global refresh includes three stages: a charge balance stage, an activation stage, and a color rendering stage, the duration required for the charge balance stage is T1, the duration required for the activation stage is T2, and the duration required for the color rendering stage is T3, then the duration required for a single refresh is T1+T2+T3, and the total refresh time is T1+T2+T3. The global refresh is that all pixels on the screen are refreshed, and one global refresh includes three stages: charge balance, activation, and color rendering. In the charge balance stage, a reverse voltage is applied so that the total amount of positive charge is equal to the total amount of negative charge during the entire refresh process, thereby ensuring that there is no residual charge in the electronic paper film. In the activation stage, periodic +15 V or −15 V high and low voltages are applied so that various colored particles in the electronic paper film are mixed evenly. In the color rendering stage, a drive voltage and a driving waveform specific to each color are applied so that the colored particles in the electronic paper film are driven to render the desired color.

Figure 3:
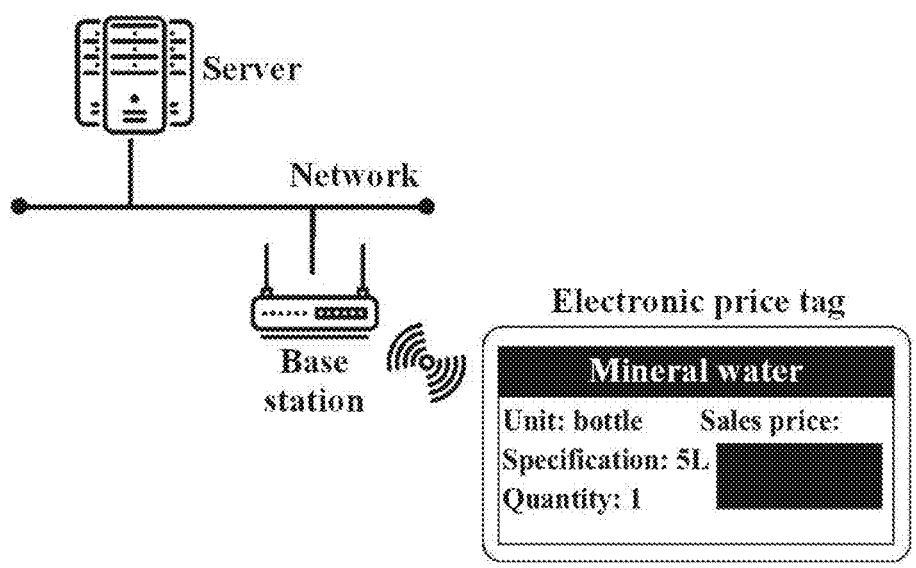
FIG. 3 is a schematic view of a display content updating device according to embodiment one of the present disclosure.

In an example, as shown in FIG. 3, a display content updating device may be a server that communicates with a controller of an electronic price tag through a base station. The server sends refresh instructions and refresh image data to the controller. The controller refreshes the display content of the electronic paper screen based on the refresh instructions and the corresponding refresh image data. The base station may be a router, and the controller is located within the wireless communication range of the base station. The electronic paper screen may be the electronic price tag. As shown in the figure, the electronic price tag includes three color regions: a region where the mineral water text is located, a region where the price is located, and a region where the attribute information of the item is located.

In the technical solutions of the embodiment of the present disclosure, a color region included in a multi-color image and a color type corresponding to the color region are acquired, facilitating targeted operations on different color regions and color types corresponding to different color regions; the multi-color image is converted into multiple pieces of refresh image data and refresh instructions corresponding to the multiple pieces of refresh image data according to positions and color types of color regions in the multi-color image, where different refresh instructions are executed asynchronously; corresponding refresh instructions are executed for different refresh image data, improving the accuracy of targeted operations on the refresh image data; the refresh instructions and the multiple pieces of refresh image data are sent to a controller of an electronic paper screen so that the controller refreshes the display content of the electronic paper screen based on the refresh instructions and the corresponding multiple pieces of refresh image data, implementing that the controller uses targeted refresh instructions for the refresh image data and performs corresponding operations on the electronic paper screen according to the refresh instructions, thereby improving the efficiency and accuracy of image data processing.

In an embodiment, the step of converting the multi-color image into the multiple pieces of refresh image data and the refresh instructions corresponding to the multiple pieces of refresh image data according to the positions and the color types of the color regions in the multi-color image includes counting the number of color types; calculating the number of single refreshes according to the number of bits of a driver IC; detecting the number of refreshes according to the number of color types and the number of single refreshes; and determining the multiple pieces of refresh image data and the refresh instructions corresponding to the multiple pieces of refresh image data according to the number of color types, the number of refreshes, and the positions and the color types of the color regions.

In this embodiment, the number of color types is used for determining the number of refreshes. The number of single refreshes may be understood as the maximum number of color regions that may be refreshed at one time by the driver IC with the number of bits corresponding to the electronic paper screen. The number of single refreshes is determined by the number of bits of the driver IC of the electronic paper screen. The number of refreshes may be determined according to the ratio of the number of color types to the number of single refreshes. Generally, in order to increase the speed of color development and reduce the energy consumption of color development, the number of refreshes is configured to be as small as possible.

In an embodiment, the quotient and remainder of the number of color types and the number of single refreshes may be calculated; and according to the quotient and the remainder, the number of refreshes is calculated. For example, if the remainder is zero, the number of refreshes is the quotient; and if the remainder is not zero, the number of refreshes is the quotient plus one.

The number of refreshes is the same as the number of refresh instructions. According to the number of refreshes, the color types are divided so as to obtain at least one color type corresponding to the refresh instructions. The color region corresponding to the color type and the color type are determined as the refresh image data corresponding to the refresh instruction.

In an example, the number of bits of the electronic paper screen determines the color encoding capability of the driver IC. A 2-bit driver IC is able to encode four colors ($2^2$), a 3-bit driver IC is able to encode eight colors ($2^3$), an n-bit driver IC is able to encode and obtain $2^n$ colors, and the number of single refreshes of the driver IC of an n-bit electronic paper screen is $2^n$. If the number of bits of the electronic paper screen is two, then the number of single refreshes is four, that is $2^2$. The quotient and remainder of the number of color types and the number of single refreshes are calculated, so as to obtain a remainder of two and a quotient of one, where the remainder is not zero, and the number of refreshes is one plus one, that is, the number of refreshes is two. The multiple pieces of refresh image data and the refresh instructions corresponding to the multiple pieces of refresh image data are determined by the image processing tool according to the number of color types, the number of refreshes, and the positions and the color types of the color regions.

In the related art, the number of colors that may be refreshed on the electronic paper screen is determined by the number of bits of the driver IC. To rend more than four and less than eight colors on the existing electronic paper screen, the 3-bit driver IC must be used. Compared with the 2-bit driver IC, the 3-bit driver IC has a larger dimension and is more expensive.

In the present disclosure, the multi-color image is processed into N pieces of image data according to the color types and the color encoding rule, and the N pieces of image data are refreshed N times with respective driving waveforms. During the refresh process, separate data protection encoding is performed on pixels that do not need to be refreshed in the image so that the electronic paper screen can achieve the multi-color (more than four colors) display of the electronic paper film through the 2-bit driver IC. The existing 2-bit driver IC supports only the refresh display with less than or equal to four colors. Through the display content updating method provided in the embodiment of the present disclosure, the refresh display with more colors can be achieved through multiple refreshes. In the embodiment of the present disclosure, the multi-color image may specifically refer to an image with more than four colors.

Counting the number of color types facilitates the targeted image processing operation on multi-color images with different numbers of color types. The number of single refreshes is calculated according to the number of bits of the driver IC, and the most effective refresh method for ICs with different bits is obtained through calculation, improving the refresh efficiency. The number of refreshes is detected according to the number of color types and the number of single refreshes. The multiple pieces of refresh image data and the refresh instructions corresponding to the multiple pieces of refresh image data are determined according to the number of color types, the number of refreshes, and the positions and the color types of the color regions. Targeted image processing is performed on the color regions of the image to improve the image refresh accuracy and efficiency. While a single refresh satisfies the refresh capability of the driver IC, the number of refreshes is increased so that the number of colors displayed on the same electronic paper screen can be increased, the number of colors developed can be increased, and the cost of achieving color diversity can be reduced.

Embodiment Two

Figure 4:
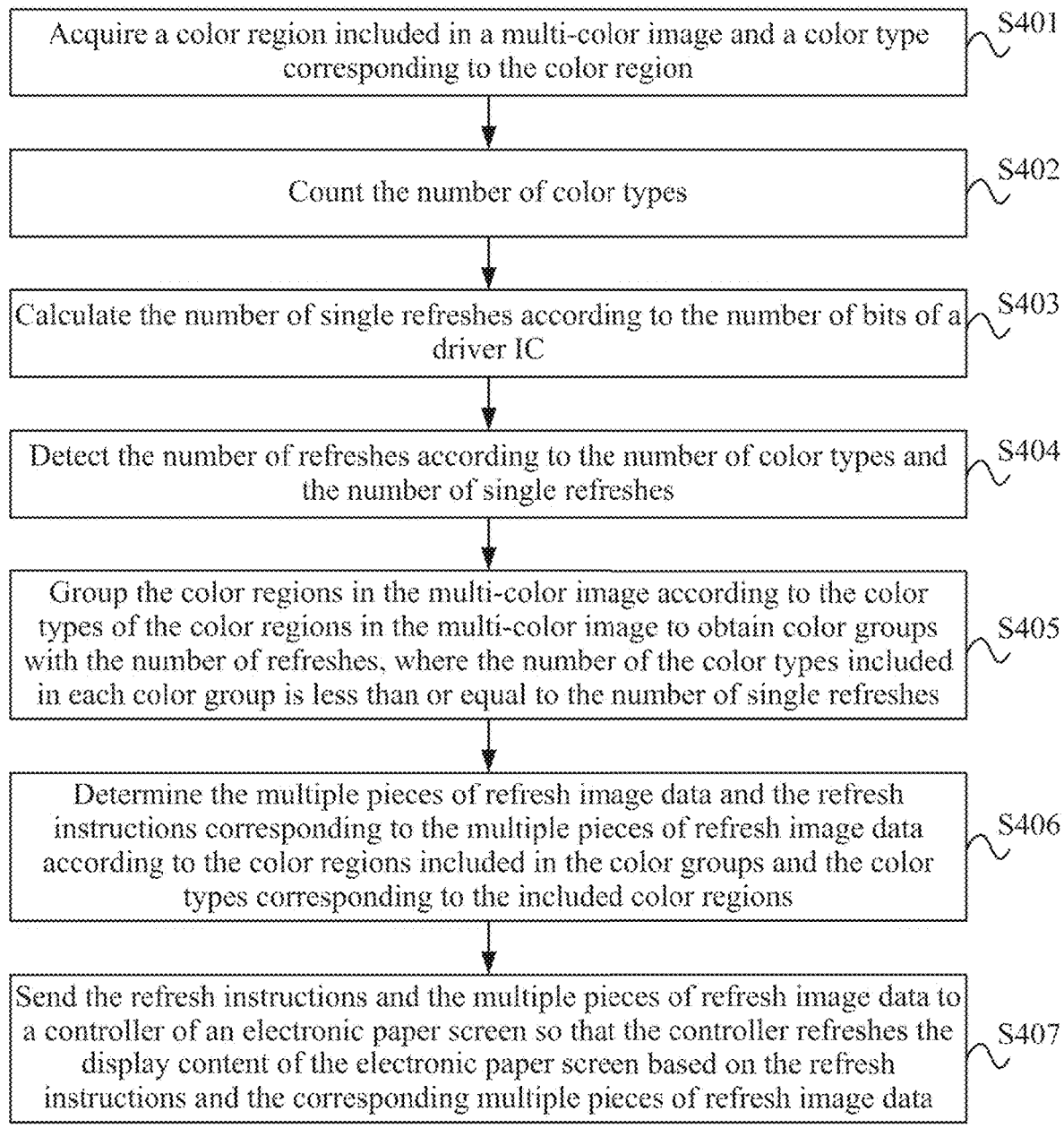
FIG. 4 is a flowchart of a display content updating method according to embodiment two of the present disclosure.

FIG. 4 is a flowchart of a display content updating method according to embodiment two of the present disclosure.

Based on the preceding embodiment, the embodiment of the present disclosure is optimized and improved. The step of converting the multi-color image into the multiple pieces of refresh image data and the refresh instructions corresponding to the multiple pieces of refresh image data according to the positions and the color types of the color regions in the multi-color image, where different refresh instructions are executed asynchronously is further limited to: counting the number of color types; calculating the number of single refreshes according to the number of bits of a driver IC; detecting the number of refreshes according to the number of color types and the number of single refreshes; and determining the multiple pieces of refresh image data and the refresh instructions corresponding to the multiple pieces of refresh image data according to the number of color types, the number of refreshes, and the positions and the color types of the color regions. The step of determining the multiple pieces of refresh image data and the refresh instructions corresponding to the multiple pieces of refresh image data according to the number of color types, the number of refreshes, and the positions and the color types of the color regions is further limited to: grouping the color regions in the multi-color image according to the color types of the color regions in the multi-color image to obtain color groups with the number of refreshes, where the number of the color types included in each color group is less than or equal to the number of single refreshes; and determining, according to the color regions included in the color groups and the color types corresponding to the color regions included in the color groups, the multiple pieces of refresh image data and the refresh instructions corresponding to the multiple pieces of refresh image data.

As shown in FIG. 4, the display content updating method according to embodiment two of the present disclosure includes the steps described below.

In S401, a color region included in a multi-color image and a color type corresponding to the color region are acquired.

In S402, the number of color types is counted.

In S403, the number of single refreshes is calculated according to the number of bits of a driver IC.

In S404, the number of refreshes is detected according to the number of color types and the number of single refreshes.

In S405, the color regions in the multi-color image are grouped according to the color types of the color regions in the multi-color image to obtain color groups with the number of refreshes, where the number of the color types included in each color group is less than or equal to the number of single refreshes.

In this embodiment, a color group includes at least one color region and the corresponding color type. The number of color groups is the same as the number of refreshes. In fact, the color group represents the color region refreshed in the same round and the corresponding refreshed color type. The number of refresh instructions is the same as the number of refreshes. Correspondingly, the refresh instructions are in one-to-one correspondence with the color groups. Due to the bit limit of the driver IC, the number of the color types for one refresh is at most the number of single refreshes. Therefore, the number of the color types included in the color group cannot be greater than the number of single refreshes.

In an embodiment, the color regions are grouped according to the color types of the color regions in the multi-color image so as to obtain color groups with the number of refreshes, where due to the bit limit of the driver IC, the number of the color types included in each color group is less than or equal to the number of single refreshes.

In an example, if the number of bits of the driver IC is 2 bits, the number of single refreshes is four. If an image that needs to be processed is a six-color image, the number of refreshes is two. The color regions are grouped according to the color types of the color regions so as to obtain two color groups, where the number of the color types included in each color group is less than or equal to four. The grouping method may be that a first color group includes four color types, and a second color group includes two color types. For another example, the grouping method may be that the first color group includes two color types, and the second color group includes four color types. For another example, the grouping method may be that the first color group includes three color types, and the second color group includes three color types.

Figure 5:
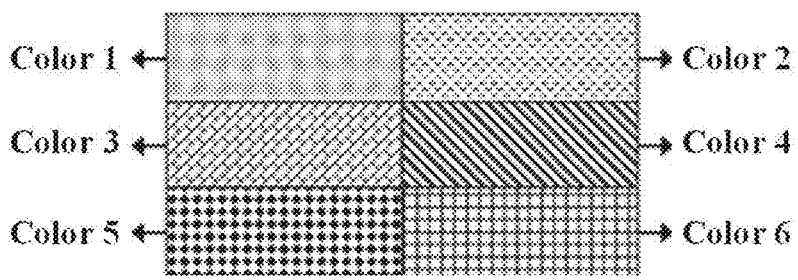
FIG. 5 is a schematic view of a six-color image according to embodiment two of the present disclosure.

As shown in FIG. 5, a schematic view of a six-color image is shown. This image is the target image to be updated and displayed on a six-color electronic paper screen. Each color in the six-color image corresponds to a region in the image. This region is a set of the positions of all pixels with the same color in the image. For ease of description, the shapes of six regions corresponding to six colors in the schematic view are rectangles. However, in practical application, the shapes of the six regions may be any shape, which is not limited here. As can be seen from the figure, the image includes six colors: color 1, color 2, color 3, color 4, color 5, and color 6. The black, white, yellow, and red electronic paper screen is used as an example, where the six colors may be as follows: color 1 is black, color 2 is white, color 3 is yellow, color 4 is red, color 5 is gray, and color 6 is orange.

As shown in FIGS. 6A and 6B, the first color group and the second color group corresponding to the six-color image are shown, where FIG. 6A shows the first color group, the first color group includes color 11, color 12, color 13, and color 14, the pixels in region 11, region 12, and region 13 corresponding to color 11, color 12, and color 13 in the first color group need to be refreshed, and the pixels in region 14 corresponding to color 14 do not need to be refreshed. In this manner, for the pixels that need to be refreshed, the driving waveform is adjusted according to the encoding rule so as to refresh the corresponding color. For the pixels that do not need to be refreshed, the driving waveform of the code of the region corresponding to the pixels that do not need to be refreshed is configured to be consistent with the output reference voltage VCOM of a display panel. VCOM is a preset voltage threshold, and VCOM may be an unfixed voltage threshold. The code of the region corresponding to the pixels that do not need to be refreshed is used as a protection code. The drive voltage for driving the movement of electronic ink in the pixels is always zero, and the pixels remain stationary during the refresh process of the electronic paper screen, so that the purpose of protecting the pixels from being refreshed can be achieved. At the same time, the color of the region corresponding to the protection code is colorless or empty, indicating that no real color refresh is performed on the region to achieve color protection of the region. It can also be understood as brushing the region with a protective color, and then the color of region 14 corresponding to color 14 is colorless. FIG. 6B shows the second color group, where the second color group includes color 21, color 22, color 23, and color 24, the pixels in region 21, region 22, and region 23 corresponding to color 21, color 22, and color 23 in the second color group need to be refreshed, and the pixels in region 24 corresponding to color 24 do not need to be refreshed. In this manner, for the pixels in region 21, region 22, and region 23 corresponding to color 21, color 22, and color 23, the driving waveform is adjusted according to the encoding rule so as to refresh the corresponding color. For the pixels in region 24 corresponding to color 24, the driving waveform of the code of region 24 is configured to be consistent with the output reference voltage VCOM of the display panel, the code of region 24 is used as a protection code. The drive voltage for driving the movement of electronic ink in the pixels is always zero, and the pixels remain stationary during the refresh process of the electronic paper screen, so that the purpose of protecting the pixels from being refreshed can be achieved, which is equivalent to that the region corresponding to the protection code is colorless, and then during the refresh process, the color of region 24 corresponding to color 24 is colorless, that is, the color of this region is not refreshed.

As can be seen from FIG. 6A, the correspondence between the first color group and the six-color image is as follows: color 11 corresponds to color 1, color 12 corresponds to color 2, color 13 corresponds to color 3, and color 14 corresponds to color 4, color 5, and color 6. The black, white, yellow, and red electronic paper screen is used as an example, where the six colors may be as follows: color 1 is black, color 2 is white, color 3 is yellow, color 4 is red, color 5 is gray, and color 6 is orange. Then, color 11 is black like color 1, color 12 is white like color 2, color 13 is yellow like color 3, and color 14 is colorless. It can be seen from this that the first color group is obtained by adjusting the three colors of red, gray, and orange in the six-color image to colorless.

As can be seen from FIG. 6B, the correspondence between the second color group and the six-color image is as follows: color 21 corresponds to color 4, color 22 corresponds to color 5, color 23 corresponds to color 6, and color 24 corresponds to color 1, color 2, and color 3. The black, white, yellow, and red electronic paper screen is used as an example, where the six colors may be as follows: color 1 is black, color 2 is white, color 3 is yellow, color 4 is red, color 5 is gray, and color 6 is orange. Then, color 21 is red like color 4, color 22 is gray like color 5, color 23 is orange like color 6, and color 24 is colorless. It can be seen from this that the second color group is obtained by adjusting the three colors of black, white, and yellow in the six-color image to colorless. At the same time, according to the encoding rule, the first color group data and the second color group data corresponding to the six-color image are obtained.

Since the number of bits of the driver IC is 2 bits, the number of single refreshes is four, and the number of the color types included in each color group is less than or equal to four.

In S406, the multiple pieces of refresh image data and the refresh instructions corresponding to the multiple pieces of refresh image data are determined according to the color regions included in the color groups and the color types corresponding to the color regions included in the color groups.

In this embodiment, the color regions included in one color group and the corresponding color types are determined as the refresh image data, and the refresh image data corresponds to one refresh instruction.

In an embodiment, according to the color regions included in a color group and the color types corresponding to the color regions included in the color group, the targeted image data processing is performed on the color group, and one piece of refresh image data and the refresh instruction corresponding to the refresh image data are determined according to the encoding rule.

In an example, for the six-color image in FIG. 5, the first color group shown in FIG. 6A, and the second color group shown in FIG. 6B, according to the encoding rule, the following content is determined: color 11 in the first color group corresponds to color 1 in the six-color image, and region 11 in the first color group corresponds to region 1 in the six-color image and is coded as 00; color 12 in the first color group corresponds to color 2 in the six-color image, and region 12 in the first color group corresponds to region 2 in the six-color image and is coded as 01; color 13 in the first color group corresponds to color 3 in the six-color image, and region 13 in the first color group corresponds to region 3 in the six-color image and is coded as 10; and color 14 in the first color group corresponds to color 4, color 5, and color 6 in the six-color image, region 14 in the first color group corresponds to region 4, region 5, and region 6 in the six-color image and is coded as 11; the pixels in region 11, region 12, and region 13 corresponding to color 11, color 12, and color 13 in the first color group need to be refreshed, and the pixels in region 14 corresponding to color 14 do not need to be refreshed. In this manner, for the pixels that need to be refreshed, the driving waveform is adjusted according to the encoding rule so as to refresh the corresponding color. For the pixels that do not need to be refreshed, the driving waveform of the code of region 14 is configured to be consistent with the output reference voltage VCOM of the display panel. VCOM is a preset voltage threshold, and VCOM may be an unfixed voltage threshold. The code of region 14 is used as a protection code, the drive voltage for driving the movement of electronic ink in the pixel is always zero, and the pixels remain stationary during the refresh process of the electronic paper screen so that the purpose of protecting the pixels from being refreshed can be achieved. At the same time, the color of the region corresponding to the protection code is colorless, and then the color of region 14 corresponding to color 14 is colorless. The black, white, yellow, and red electronic paper screen is used as an example, where the six colors may be as follows: color 1 is black, color 2 is white, color 3 is yellow, color 4 is red, color 5 is gray, and color 6 is orange. Then, color 11 is black like color 1, color 12 is white like color 2, color 13 is yellow like color 3, and color 14 is colorless. Similarly, region 11 and region 1 are the same region, region 12 and region 2 are the same region, region 13 and region 3 are the same region, and region 14 is a set of three regions: region 4, region 5, and region 6. It can be seen from this that the first color group is obtained by adjusting the three colors of red, gray, and orange in the six-color image to colorless. Correspondingly, the refresh image data corresponding to the first refresh instruction is as follows: region 1 is coded as 00, region 2 is coded as 01, region 3 is coded as 10, region 4 is coded as 11, region 5 is coded as 11, and region 6 is coded as 11.

Color 21 in the second color group corresponds to color 4 in the six-color image, and region 21 in the second color group corresponds to region 4 in the six-color image and is coded as 00; color 22 in the second color group corresponds to color 5 in the six-color image, and region 22 in the second color group corresponds to region 5 in the six-color image and is coded as 01; color 23 in the second color group corresponds to color 6 in the six-color image, and region 23 in the second color group corresponds to region 6 in the six-color image and is coded as 10; and color 24 in the second color group corresponds to color 1, color 2, and color 3 in the six-color image, region 24 in the second color group corresponds to region 1, region 2, and region 3 in the six-color image and is coded as 11; the pixels in region 21, region 22, and region 23 corresponding to color 21, color 22, and color 23 in the second color group need to be refreshed, and the pixels in region 24 corresponding to color 24 do not need to be refreshed. In this manner, for the pixels that need to be refreshed, the driving waveform is adjusted according to the encoding rule so as to refresh the corresponding color. For the pixels that do not need to be refreshed, the driving waveform of the code of region 24 is configured to be consistent with the output reference voltage VCOM of the display panel. VCOM is a preset voltage threshold, and VCOM may be an unfixed voltage threshold. The code of region 24 is used as a protection code, the drive voltage for driving the movement of electronic ink in the pixel is always zero, and the pixels remain stationary during the refresh process of the electronic paper screen so that he purpose of protecting the pixels from being refreshed can be achieved. At the same time, the color of the region corresponding to the protection code is colorless, and then the color of region 24 corresponding to color 24 is colorless. The black, white, yellow, and red electronic paper screen is used as an example, where the six colors may be as follows: color 1 is black, color 2 is white, color 3 is yellow, color 4 is red, color 5 is gray, and color 6 is orange. Then, color 21 is red like color 4, color 22 is gray like color 5, color 23 is orange like color 6, and color 24 is colorless. Similarly, region 21 and region 4 are the same region, region 22 and region 5 are the same region, region 23 and region 6 are the same region, and region 24 is a set of three regions: region 1, region 2, and region 3. It can be seen from this that the second color group is obtained by adjusting the three colors of black, white, and yellow in the six-color image to colorless. Correspondingly, the refresh image data corresponding to the second refresh instruction is as follows: region 21 is coded as 00, region 22 is coded as 01, region 23 is coded as 10, and region 24 is coded as 11.

In S407, the refresh instructions and the multiple pieces of refresh image data are sent to a controller of an electronic paper screen so that the controller refreshes the display content of the electronic paper screen based on the refresh instructions and the corresponding multiple pieces of refresh image data.

In the technical solution of the embodiment of the present disclosure, the number of refreshes required is calculated. The color regions are grouped according to the color types of the color regions so as to obtain color groups with the number of refreshes, where the number of the color types included in each color group is less than or equal to the number of single refreshes. According to the color regions included in the color groups and the color types corresponding to the color regions included in the color groups, the multiple pieces of refresh image data and the refresh instructions corresponding to the multiple pieces of refresh image data are determined. In this manner, a single refresh can be accurately controlled through the color groups to satisfy the refresh capability of the driver IC; and at the same time, the color regions and color types can be flexibly combined, thereby improving the color refresh flexibility.

In an embodiment, the step of determining, according to the color regions included in the color groups and the color types corresponding to the included color regions, the multiple pieces of refresh image data and the refresh instructions corresponding to the multiple pieces of refresh image data includes: determining the color types included in the color group and the color regions corresponding to the color types included in the color group as a piece of refresh image data and a refresh instruction corresponding to the piece of refresh image data, where the refresh instruction is a partial refresh instruction. Alternatively, the step of determining, according to the color regions included in the color groups and the color types corresponding to the included color regions, the multiple pieces of refresh image data and the refresh instructions corresponding to the multiple pieces of refresh image data includes: among multiple color groups, determining a color group including the largest number of color types as a third color group and determining a remaining color group as a fourth color group; updating a color type of a color region other than a color region included in the third color group to the color type included in the third color group and adding the color type of the color region other than the color region included in the third color group to the third color group; determining the color types included in the third color group after the addition and the color regions corresponding to the color types included in the third color group as third refresh image data and a third refresh instruction corresponding to the third refresh image data, where the third refresh instruction is a global refresh instruction; and determining the color types included in the fourth color group and the color regions corresponding to the color types included in the fourth color group as fourth refresh image data and a fourth refresh instruction corresponding to the fourth refresh image data, where the fourth refresh instruction is the partial refresh instruction, and the third refresh instruction is executed before the fourth refresh instruction.

In an embodiment, the color types included in the color group and the color regions corresponding to the color types included in the color group are determined as a piece of refresh image data and a refresh instruction corresponding to the piece of refresh image data, where the refresh instruction is a partial refresh instruction. In fact, through multiple partial refreshes, the number of colors refreshed each time is less than or equal to the number of single refreshes, achieving a breakthrough in the maximum number of displayed colors of the driver IC on the same electronic paper screen and achieving more displayed colors.

Among multiple color groups, a color group including the largest number of color types is determined as the third color group and the remaining color group is determined as the fourth color group; in addition, it is also feasible that any color group is determined as the third color group, and the remaining color group except the third color group is determined as the fourth color group. Other cases in which the third color group and the fourth color group are determined exist, and the details are not limited. The color type of the color region other than the color region included in the third color group is updated to the color type included in the third color group and the color type of the color region other than the color region comprised in the third color group is added to the third color group. The color types included in the third color group after the addition and the color regions corresponding to the color types included in the third color group are determined as third refresh image data and the third refresh instruction corresponding to the third refresh image data, where the third refresh instruction is a global refresh instruction. The color types included in the fourth color group and the color regions corresponding to the color types included in the fourth color group are determined as fourth refresh image data and the fourth refresh instruction corresponding to the fourth refresh image data, where the fourth refresh instruction is the partial refresh instruction, and the third refresh instruction is executed before the fourth refresh instruction. The third color group is used for the global refresh, and the fourth color group is used for the partial refresh. The color regions included in the third color group are all color regions. The number of the color types included in the fourth color group is less than or equal to the number of single refreshes. At least one fourth color group may be provided. The refresh process represented by the third color group may be understood as follows: the color regions of the color types with the number of single refreshes are selected and refreshed, the color types of the remaining color regions are different from the preceding color types with the number of single refreshes, the original refreshed color types of the remaining color regions are not considered, and one or more of the preceding color types with the number of single refreshes are selected and refreshed; in the subsequent partial refresh process, the correct color type is selected so as to re-refresh or overwrite and refresh these remaining color regions, that is, the global refresh color is discarded.

In an example, the process of multiple partial refreshes may be as follows: since the electronic paper screen using the 2-bit driver IC only updates up to four colors each time, the electronic paper screen needs to be refreshed twice when a six-color image is used as the target image. For the first refresh, the refresh image is the first color group, the number of refreshes is the first refresh, and the refresh type is the partial refresh for any position. For the second refresh, the refresh image is the second color group, the number of refreshes is the second refresh, and the refresh type is the partial refresh for any position. Two partial refreshes for any position are used for the six-color image to achieve a multi-color image update. The partial refresh for any position is to refresh only the pixels on the screen corresponding to the specific color in the target image. One partial refresh for any position includes three stages: charge balance, activation, and color rendering. In the charge balance stage, a reverse voltage is applied so that the total amount of positive charge is equal to the total amount of negative charge during the entire refresh process, thereby ensuring that there is no residual charge in the electronic paper film. In the activation stage, periodic +15 V or −15 V high and low voltages are applied so that various colored particles in the electronic paper film are mixed evenly. In the color rendering stage, a drive voltage and a driving waveform specific to each color are applied so that the colored particles in the electronic paper film are driven to render the desired color.

In addition, the refresh process of the electronic paper screen needs to be completed in conjunction with the driving waveform. As shown in FIG. 7, the first driving waveform corresponding to the first color group is shown. Since the first refresh is the partial refresh for any position, the pixels in region 11, region 12, and region 13 corresponding to color 11, color 12, and color 13 need to be refreshed, and the pixels in region 14 corresponding to color 14 do not need to be refreshed. In this manner, for the pixels that need to be refreshed, the driving waveforms of code 00, code 01, and code 10 are adjusted so as to refresh the corresponding colors. For the pixels that do not need to be refreshed, the driving waveform of code 11 is configured to be consistent with the output reference voltage VCOM of the display panel. VCOM is a preset voltage threshold, and VCOM may be an unfixed voltage threshold. Code 11 is used as a protection code, the drive voltage for driving the movement of electronic ink in the pixel is always zero, and the pixels remain stationary during the refresh process of the electronic paper screen so that the purpose of protecting the pixels from being refreshed can be achieved.

As shown in FIG. 8, the second driving waveform corresponding to the second color group is shown. Since the second refresh is the partial refresh for any position, the pixels in region 21, region 22, and region 23 corresponding to color 21, color 22, and color 23 need to be refreshed, and the pixels in region 24 corresponding to color 24 do not need to be refreshed. In this manner, for the pixels that need to be refreshed, the driving waveforms of code 00, code 01, and code 10 are adjusted so as to refresh the corresponding colors. For the pixels that do not need to be refreshed, the driving waveform of code 11 is configured to be consistent with VCOM. Code 11 is used as a protection code, the drive voltage for driving the movement of electronic ink in the pixel is always zero, and the pixels remain stationary during the refresh process of the electronic paper screen so that the purpose of protecting the pixels from being refreshed can be achieved.

In this embodiment, the six-color image can be refreshed through two partial refreshes. By analogy, an image with 3*N colors can be refreshed through N refreshes.

In this embodiment, two refreshes are performed; in the first refresh, the regions corresponding to color 1, color 2, and color 3 in the six-color image are refreshed, and the regions corresponding to color 4, color 5, and color 6 are not refreshed; and in the second refresh, the regions corresponding to color 4, color 5, and color 6 in the six-color image are refreshed, and the regions corresponding to color 1, color 2, and color 3 that have been refreshed are protected from being refreshed so that the multi-color display of the electronic paper screen is achieved.

In this embodiment, the four-color electronic paper screen of black, white, yellow, and red is used as an example to describe the method of multiple refreshes in conjunction with a protection code to achieve the multi-color display. The preceding methods are applicable to the four-color electronic paper screen of black, white, red, and yellow, applicable to the four-color electronic paper screen of white, red, yellow, and blue or another type, applicable to the three-color electronic paper screen of black, white, and red, of black, white, and yellow, or of another type, and applicable to the two-color electronic paper screen of black and white or another type. In this embodiment, the refresh method for the six-color image is described. The preceding refresh methods are applicable to not only the six-color image but also an image that includes only some of the six colors, which is not limited here.

Figures 10B, 11A:
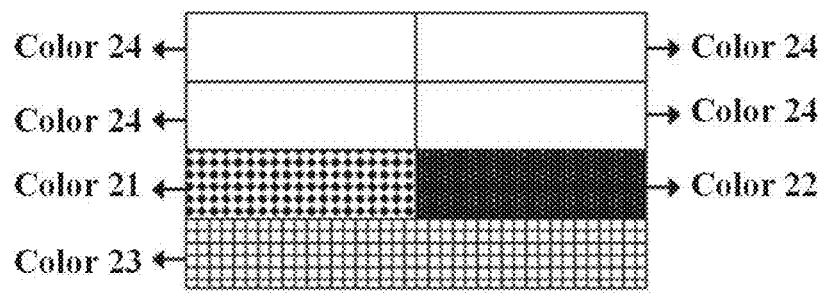
FIG. 10B is a schematic view of an image of a second color group corresponding to a seven-color image according to embodiment two of the present disclosure.
FIG. 11A is a schematic diagram of a first driving waveform corresponding to a first color group of a seven-color image according to embodiment two of the present disclosure.

In an exemplary example, the process of the first global refresh and multiple partial refreshes may be as follows: among multiple color groups, as shown in FIG. 9, a schematic view of a seven-color image is shown. This image is the target image to be updated and displayed on a seven-color electronic paper screen. Each color in the seven-color image corresponds to a region in the image, which is a set of the positions of all pixels with the same color in the image. For ease of description, the shapes of seven regions corresponding to seven colors in the schematic view are rectangles. However, in practical application, the shapes of the seven regions may be any shape, which is not limited here. As can be seen from the figure, the image includes seven colors: color 1, color 2, color 3, color 4, color 5, color 6, and color 7. The black, white, yellow, and red electronic price tag is used as an example, where the seven colors may be as follows: color 1 is black, color 2 is white, color 3 is yellow, color 4 is red, color 5 is gray 1, color 6 is gray 2, and color 7 is orange. As shown in FIGS. 10A and 10B, the first color group and the second color group corresponding to the seven-color image are shown. FIG. 10A shows the first color group, and the first color group includes color 11, color 12, color 13, and color 14. FIG. 10B shows the second color group, and the second color group includes color 21, color 22, color 23, and color 24, where color 24 is colorless.

As can be seen from FIG. 10A, the correspondence between the seven-color image and the first color group is as follows: color 11 corresponds to color 1, and region 11 corresponds to region 1 and is coded as 00; color 12 corresponds to color 2, color 5, color 6, and color 7, and region 12 corresponds to region 2, region 5, region 6, and region 7 and is coded as 01; color 13 corresponds to color 3, and region 13 corresponds to region 3 and is coded as 10; and color 14 corresponds to color 4, and region 14 corresponds to region 4 and is coded as 11. The black, white, yellow, and red electronic paper screen is used as an example, where the seven colors may be as follows: color 1 is black, color 2 is white, color 3 is yellow, color 4 is red, color 5 is gray 1, color 6 is gray 2, and color 7 is orange. Then, color 11 is black like color 1, color 12 is white like color 2, color 13 is yellow like color 3, and color 14 is red like color 4. Similarly, region 11 and region 1 are the same region, region 12 is a set of four regions: region 2, region 5, region 6, and region 7, region 13 and region 3 are the same region, and region 14 and region 4 are the same region. It can be seen from this that when the three colors of gray 1, gray 2, and orange in the seven-color image are adjusted to white, the colors of region 5, region 6, and region 7 where gray 1, gray 2, and orange are located are alternative colors, and a first refresh image is obtained. In this embodiment, the alternative color is white, that is, color 2 and color 12. In addition, the alternative color may be another color, for example, color 3 and color 13, and the colors of region 5, region 6, and region 7 are color 13. For another example, the alternative color may be color 4 and color 14, and the colors of region 5, region 6, and region 7 are color 14, which is not specifically limited.

As can be seen from FIG. 10B, the correspondence between the seven-color image and the second color group is as follows: color 21 corresponds to color 5, and region 21 corresponds to region 5 and is coded as 00; color 22 corresponds to color 6, and region 22 corresponds to region 6 and is coded as 01; color 23 corresponds to color 7, and region 23 corresponds to region 7 and is coded as 10; and color 24 corresponds to color 1, color 2, color 3, and color 4, region 24 corresponds to region 1, region 2, region 3, and region 4 and is coded as 11, the pixels in region 21, region 22, and region 23 corresponding to color 21, color 22, and color 23 in the second color group need to be refreshed, and the pixels in region 24 corresponding to color 24 do not need to be refreshed. In this manner, for the pixels that need to be refreshed, the driving waveform is adjusted according to the encoding rule so as to refresh the corresponding color. For the pixels that do not need to be refreshed, the driving waveform of the code of region 24 is configured to be consistent with the output reference voltage VCOM of the display panel. VCOM is a preset voltage threshold, and VCOM may be an unfixed voltage threshold. The code of region 24 is used as a protection code, the drive voltage for driving the movement of electronic ink in the pixel is always zero, and the pixels remain stationary during the refresh process of the electronic paper screen so that the purpose of protecting the pixels from being refreshed can be achieved, the color of the region corresponding to the protection code is colorless, and then the color of region 24 corresponding to color 24 is colorless. The black, white, yellow, and red electronic paper screen is used as an example, where the seven colors may be as follows: color 1 is black, color 2 is white, color 3 is yellow, color 4 is red, color 5 is gray 1, color 6 is gray 2, and color 7 is orange. Then, color 21 is gray 1 like color 5, color 22 is gray 2 like color 6, color 23 is orange like color 7, and color 24 is colorless. Similarly, region 21 and region 5 are the same region, region 22 and region 6 are the same region, region 23 and region 7 are the same region, and region 24 is a set of four regions: region 1, region 2, region 3, and region 4. It can be seen from this that a second refresh image is obtained by adjusting the four colors of black, white, yellow, and red in the seven-color image to colorless.

At the same time, according to the encoding rule, the first refresh image data and the second refresh image data corresponding to the seven-color image are obtained.

Since the electronic paper screen using the 2-bit driver IC only updates up to four colors each time, the electronic paper screen needs to be refreshed twice when the seven-color image is used as the target image. For the first refresh, the refresh image is the first color group, the number of refreshes is the first refresh, and the refresh type is the global refresh. The global refresh includes three stages: the charge balance stage, the activation stage, and the color rendering stage. The duration required for the charge balance stage is T11, the duration required for the activation stage is T12, the duration required for the color rendering stage is T13, and the duration required for a single refresh is T11+T12+T13. For the second refresh, the refresh image is the second color group, the number of refreshes is the second refresh, and the refresh type is the partial refresh for any position. One partial refresh for any position includes three stages: the charge balance stage, the activation stage, and the color rendering stage. The duration required for the charge balance stage is T21, the duration required for the activation stage is T22, the duration required for the color rendering stage is T23, and the duration required for a single refresh is T21+T22+T23.

Figure 11B:
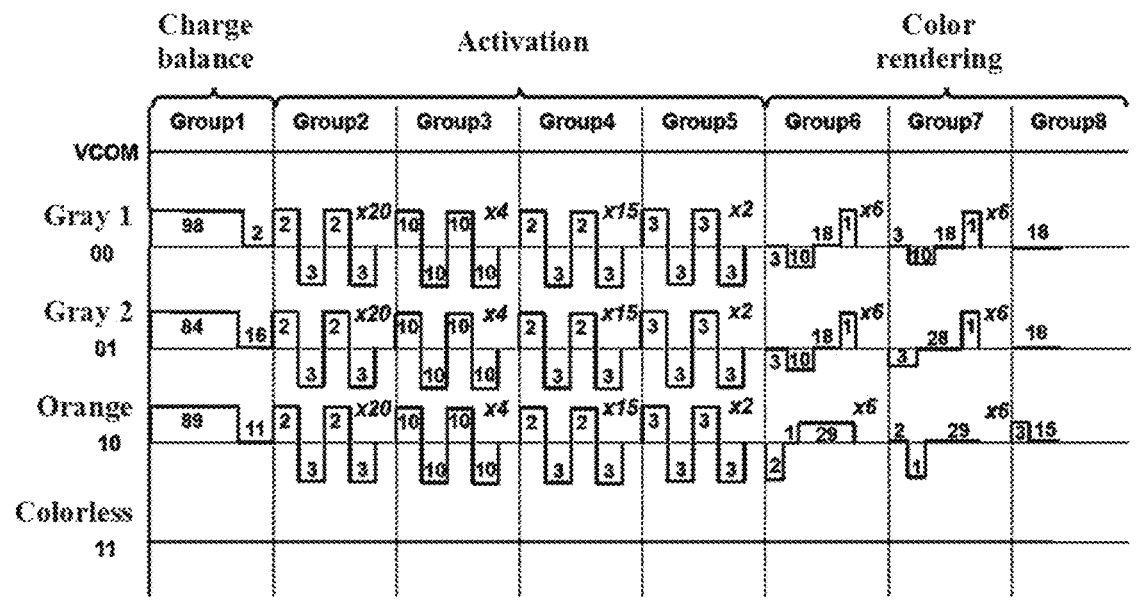

In addition, the refresh process of the electronic paper screen needs to be completed in conjunction with the driving waveform. As shown in FIG. 11A, the first driving waveform corresponding to the first refresh image data is shown. Since the first refresh is the global refresh, all pixels on the screen must be refreshed. Corresponding colors are refreshed by adjusting the driving waveforms of code 00, code 01, code 10, and code 11. As shown in FIG. 11B, the second driving waveform corresponding to the second refresh image data is shown. Since the second refresh is the partial refresh for any position, the pixels in region 21, region 22, and region 23 corresponding to color 21, color 22, and color 23 need to be refreshed, and the pixels in region 24 corresponding to color 24 do not need to be refreshed. In this manner, for the pixels that need to be refreshed, the driving waveforms of code 00, code 01, and code 10 are adjusted so as to refresh the corresponding colors. For the pixels that do not need to be refreshed, the driving waveform of code 11 is configured to be consistent with VCOM. Code 11 is used as a protection code, the drive voltage for driving the movement of electronic ink in the pixel is always zero, and the pixels remain stationary during the refresh process of the electronic paper screen so that the purpose of protecting the pixels from being refreshed can be achieved.

Two refreshes are performed; in the first refresh, the regions corresponding to color 1, color 2, color 3, and color 4 in the seven-color image are refreshed, and the regions corresponding to color 5, color 6, and color 7 are refreshed to color 2; and in the second refresh, the regions corresponding to color 5, color 6, and color 7 in the seven-color image are refreshed, and the regions corresponding to color 1, color 2, color 3, and color 4 that have been refreshed are protected from being refreshed so that the multi-color display of the electronic paper screen is achieved.

In this embodiment, the seven-color image is refreshed through two refreshes. By analogy, an image with 3*N+1 colors is able to be refreshed through N refreshes. In this embodiment, for ease of description, the three refreshed colors during the second refresh are all set to the same color in the first color group. Similarly, the three refreshed colors during the second refresh may be set to any one or more colors among the four colors of the first color group. In this embodiment, four colors are refreshed for the first refresh, and three other colors are refreshed for the second refresh. The four refreshed colors during the first refresh are any four colors among the seven colors and are not limited to the specific four colors among the seven colors. The three refreshed colors during the second refresh are three colors other than the four refreshed colors during the first refresh.

In this embodiment, the four-color electronic paper screen of black, white, yellow, and red is used as an example to describe the method of multiple refreshes in conjunction with a protection code to achieve the multi-color display. The preceding method is applicable to the four-color electronic paper screen of black, white, red, and yellow, applicable to the four-color electronic paper screen of white, red, yellow, and blue or another type, applicable to the three-color electronic paper screen of black, white, and red, of black, white, and yellow, or of another type, and applicable to the two-color electronic paper screen of black and white or another type. In this embodiment, the refresh method for the seven-color image is described. The preceding refresh method is applicable to not only the seven-color image but also an image that includes only some of the seven colors, which is not limited here.

The color types included in the color group and the color regions corresponding to the color types included in the color group are determined as a piece of refresh image data and a refresh instruction corresponding to the piece of refresh image data, where the refresh instruction is a partial refresh instruction; based on multiple partial refreshes, the colors with the number that exceeds the largest number of colors that can be displayed each time by the driver IC are displayed on the same electronic paper screen, and the refreshed color regions and color types are flexibly configured. Among multiple color groups, a color group including the largest number of color types is determined as a third color group and a remaining color group is determined as a fourth color group; the color type of the color region other than the color region included in the third color group is updated to the color type included in the third color group and the color type of the color region other than the color region comprised in the third color group is added to the third color group; the color types included in the third color group after the addition and the color regions corresponding to the color types included in the third color group are determined as third refresh image data and a third refresh instruction corresponding to the third refresh image data, where the third refresh instruction is a global refresh instruction; and the color types included in the fourth color group and the color regions corresponding to the color types included in fourth color group are determined as fourth refresh image data and a fourth refresh instruction corresponding to the fourth refresh image data, where the fourth refresh instruction is the partial refresh instruction, and the third refresh instruction is executed before the fourth refresh instruction. Through the first global refresh and subsequent partial refreshes, the colors with the number that exceeds the largest number of colors that can be displayed each time by the driver IC are displayed on the same electronic paper screen, and the refreshed color regions and color types are flexibly configured; according to the refresh data of different multi-color images, the targeted refresh methods are designed, thereby improving the refresh accuracy and achieved the multi-color display effect on the electronic paper screen.

Embodiment Three

Figure 12A:
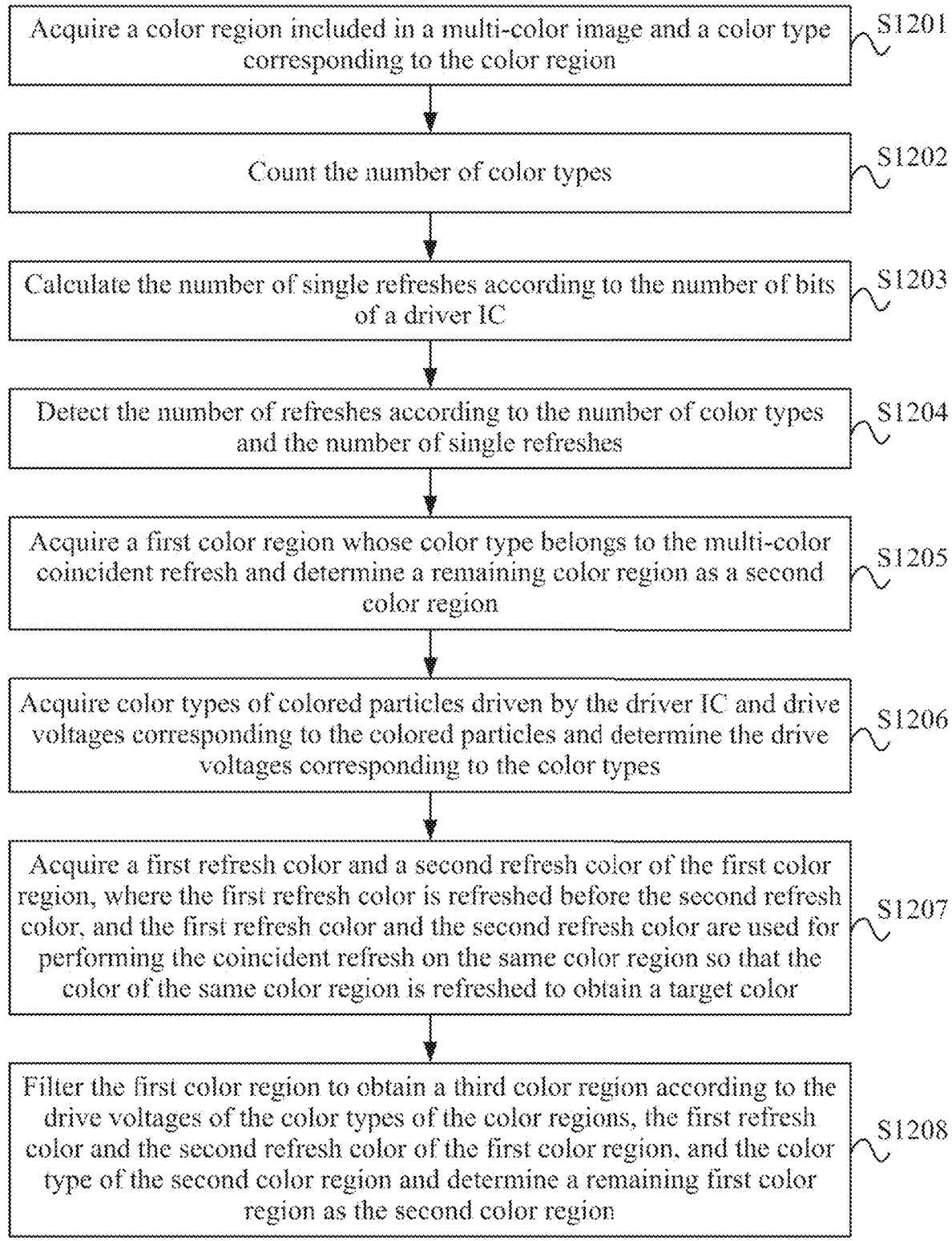
FIG. 12A is a flowchart of a display content updating method according to embodiment three of the present disclosure.
Figure 12B:
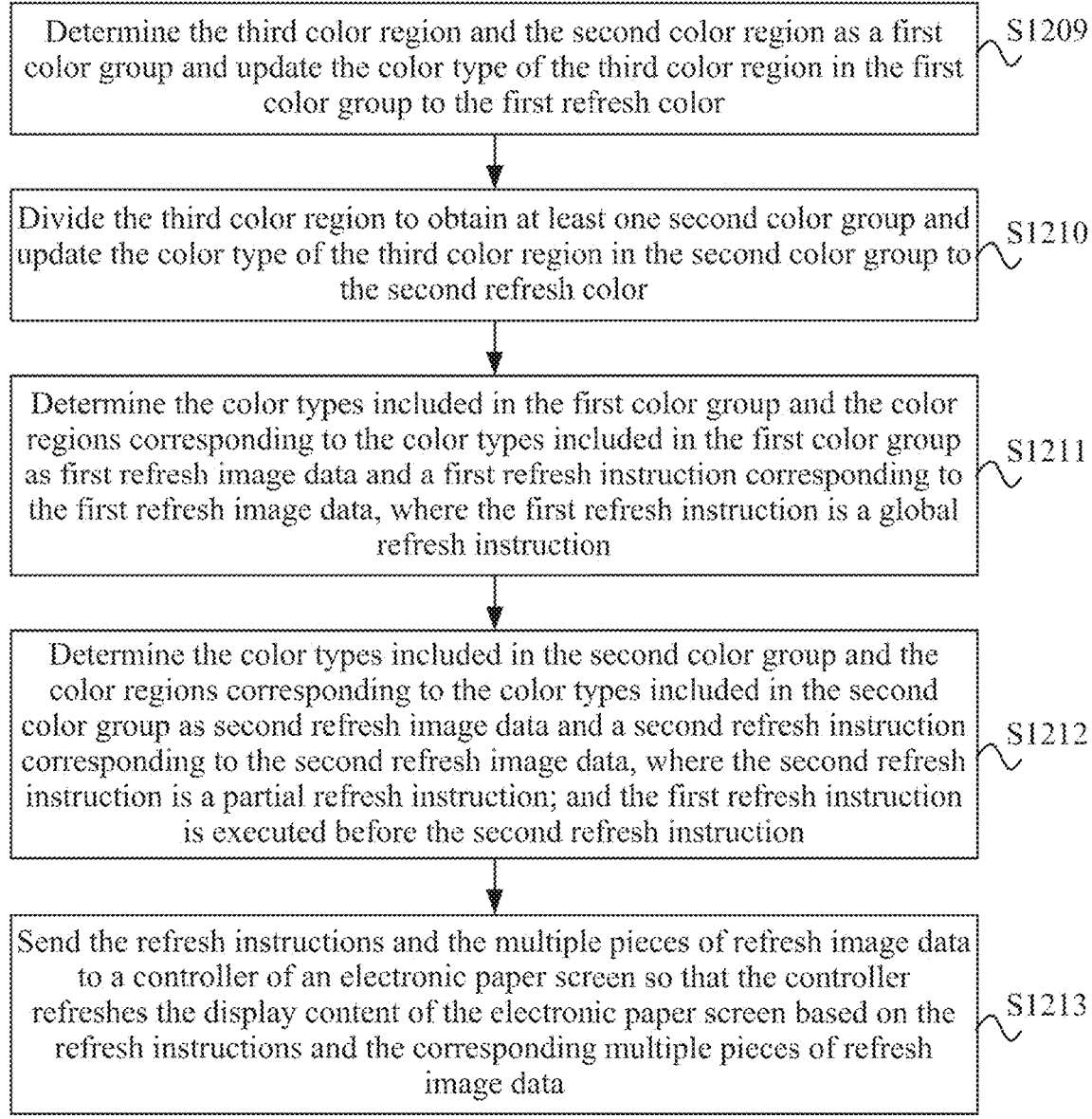
FIG. 12B is a flowchart of a display content updating method according to embodiment three of the present disclosure.

FIGS. 12A and 12B are each a flowchart of a display content updating method according to embodiment three of the present disclosure. Based on the preceding embodiment, the embodiment of the present disclosure is optimized and improved. The step of grouping the color regions in the multi-color image according to the color types of the color regions in the multi-color image to obtain the color groups with the number of refreshes includes acquiring a first color region whose color type belongs to the multi-color coincident refresh and determining a remaining color region as a second color region; acquiring color types of colored particles driven by the driver IC and drive voltages corresponding to the colored particles and determining drive voltages corresponding to the color types of the color regions in the multi-color image; acquiring a first refresh color and a second refresh color of the first color region, where the first refresh color is refreshed before the second refresh color, and the first refresh color and the second refresh color are used for performing the coincident refresh on the same color region so that the color of the same color region is refreshed to obtain a target color; filtering the first color region to obtain a third color region according to the drive voltages of the color types of the color regions, the first refresh color and the second refresh color of the first color region, and the color type of the second color region and determining a remaining first color region as the second color region; determining the third color region and the second color region as a first color group and updating the color type of the third color region in the first color group to the first refresh color; and dividing the third color region to obtain at least one second color group and updating the color type of the third color region in the second color group to the second refresh color. The step of determining, according to the color regions included in the color groups and the color types corresponding to the color regions included in the color groups, the multiple pieces of refresh image data and the refresh instructions corresponding to the multiple pieces of refresh image data includes determining the color types included in the first color group and the color regions corresponding to the color types included in the first color group as first refresh image data and a first refresh instruction corresponding to the first refresh image data, where the first refresh instruction is a global refresh instruction; and determining the color types included in the second color group and the color regions corresponding to the color types included in the second color group as second refresh image data and a second refresh instruction corresponding to the second refresh image data, where the second refresh instruction is a partial refresh instruction, and the first refresh instruction is executed before the second refresh instruction.

As shown in FIGS. 12A and 12B, the display content updating method according to embodiment three of the present disclosure specifically includes the steps described below.

In S1201, a color region included in a multi-color image and a color type corresponding to the color region are acquired.

In S1202, the number of color types is counted.

In S1203, the number of single refreshes is calculated according to the number of bits of a driver IC.

In S1204, the number of refreshes is detected according to the number of color types and the number of single refreshes.

In S1205, a first color region whose color type belongs to the multi-color coincident refresh is acquired and a remaining color region is determined as a second color region.

In this embodiment, the multi-color coincident refresh may be understood as multiple refreshes for the same target color region. The target color is the color that the multi-color image finally displays in this color region. The target color may be the same as or different from the final refresh color during the multi-color coincident refresh.

In an embodiment, the color types in the color regions of the multi-color image are distinguished, the color region belonging to the multi-color coincident refresh is the first color region, and the remaining color region, that is, the color region that does not belong to the multi-color coincident refresh, is determined as the second color region.

In an example, as shown in FIG. 9, a schematic view of a seven-color image is shown. This image is the target image to be updated and displayed on a seven-color electronic paper screen. Each color in the seven-color image corresponds to a region in the image. This region is a set of the positions of all pixels with the same color in the image. For ease of description, the shapes of seven regions corresponding to seven colors in the schematic view are rectangles. However, in practical application, the shapes of the seven regions may be any shape, which is not limited here. As can be seen from the figure, the image includes seven colors: color 1, color 2, color 3, color 4, color 5, color 6, and color 7. The preceding seven colors correspond to the colors of particles in the electronic paper film used in the electronic paper screen and the mixed colors between the particles. The black, white, yellow, and red electronic paper screen is used as an example, where the seven colors may be as follows: color 1 is black, color 2 is white, color 3 is yellow, color 4 is red, color 5 is gray 1, color 6 is gray 2, and color 7 is orange. Gray 1 and gray 2 are the mixed colors of black particles and white particles, and orange is the mixed color of yellow particles and red particles. Similarly, the preceding seven colors may be any seven colors in a color set formed by the colors of the particles in the electronic paper film and the mixed colors between the particles.

In addition, the color region where black is located needs to be refreshed with white first and then black, the color region where yellow is located needs to be refreshed with red first and then yellow, the first color region is a region where color 1, color 3, color 5, color 6, and color 7 are located, and the second color region is a region where color 2 and color 4 are located.

In S1206, color types of colored particles driven by the driver IC and drive voltages corresponding to the colored particles are acquired and the drive voltages corresponding to the color types of the color regions in the multi-color image are determined.

In this embodiment, the drive voltage is a voltage that drives the colored particles to develop color. The drive voltage is used for driving the colored particles to develop color. Different drive voltages have different driving speeds and driving consumption. Generally, the driving speed of a large drive voltage is fast and short time consuming; the driving speed of a small drive voltage is slow and long time consuming.

In an embodiment, the color types in the color regions of the multi-color image are analyzed, the color types of the colored particles driven by the driver IC and the drive voltages corresponding to the colored particles are acquired, and the drive voltages corresponding to the color types of the color regions of the multi-color image are determined.

In an example, as shown in FIG. 13, a driving waveform for the existing four-color electronic paper screen refresh is shown. The example illustrates the driving waveform of the four-color electronic paper screen of black, white, yellow, and red. The driving waveform includes eight groups, where Group 1 corresponds to the charge balance stage, Group 2 to Group 5 correspond to the activation stage, and Group 6 to Group 8 correspond to the color rendering stage. The driving waveform supports the debugging of five signals: VCOM, black (corresponding to code 00), white (corresponding to code 01), yellow (corresponding to code 10), and red (corresponding to code 11). The horizontal axis in the figure represents time, and each time unit corresponds to one frame. The vertical axis in the figure corresponds to the voltage, and the voltages from low to high correspond to five voltages: VSNH, VSNL, GND, VSPL, and VSPH. VSNH is a large negative voltage (usually −15 V), VSNL is a small negative voltage (usually −5 V), GND is the ground voltage (usually 0 V), VSPL is a small positive voltage (usually +5 V), and VSPH is a large positive voltage (usually +15 V). Different colored particles in the electronic paper film are designed to have different charge-to-mass ratios so that different drive voltages are used for effective driving. The four-color electronic paper film of black, white, yellow, and red is used as an example. The black particle is positively charged, has a relatively large charge-to-mass ratio, and corresponds to the large positive drive voltage VSPH; the white particle is negatively charged, has a relatively small charge-to-mass ratio, and corresponds to the small negative drive voltage VSNL; the yellow particle is negatively charged, has a relatively large charge-to-mass ratio, and corresponds to the large negative drive voltage VSNH; and the red particle is positively charged, has a relatively small charge-to-mass ratio, and corresponds to the small positive drive voltage VSPL. Therefore, VSNH corresponds to the drive voltage of the yellow particle, VSNL corresponds to the drive voltage of the white particle, VSPL corresponds to the drive voltage of the red particle, and VSPH corresponds to the drive voltage of the black particle. The numbers in the figure represent the number of frames for which the voltage is maintained, and the symbol formed by x and a number represents the number of times the waveform repeats in this group. The driving waveforms corresponding to the four colors of black, white, yellow, and red are debugged so that the electronic paper screen can display the color information of the corresponding picture on each pixel.

In S1207, a first refresh color and a second refresh color of the first color region are acquired, where the first refresh color is refreshed before the second refresh color, and the first refresh color and the second refresh color are used for performing the coincident refresh on the same color region so that the color of the same color region is refreshed to obtain a target color.

In this embodiment, during the refresh process of the electronic paper screen, the mixed colors and certain single colors may be obtained by superimposing at least two colors into the same color region and refreshing. The first color region may refer to a color region whose color type may be divided into multiple refreshes. The color type of the first color region is re-divided into the first refresh color and the second refresh color, so as to achieve the display of the original color type in the first color region through multiple refreshes. The first refresh color and the second refresh color are different, and the target color may be the same as the first refresh color or the second refresh color, or the target color may be different from both the first refresh color and the second refresh color.

In an embodiment, the first color region of the multi-color image that requires the coincident refresh is analyzed, and the first refresh color and the second refresh color of the first color region are acquired so that after the refresh, the first color region displays the target color, and the first refresh color is refreshed before the second refresh color.

In an example, the four-color electronic paper screen of black, white, red, and yellow is used as an example. In an embodiment, white corresponding to VSNL and black corresponding to VSPH are used as one group and mixed into gray, and yellow corresponding to VSNH and red corresponding to VSPL are used as another group and mixed into orange. Depending on the mixing ratio, white and black is able to be mixed into a variety of grays, and yellow and red is able to be mixed into a variety of oranges. The first refresh color is white corresponding to VSNL, the second refresh color is black corresponding to VSPH, and the target color is gray.

In addition, some special cases exist. For example, black may be obtained through the coincident refresh of white and black. The first refresh color is white, the second refresh color is black, and the target color is black.

In S1208, the first color region is filtered to obtain a third color region according to the drive voltages of the color types of the color regions, the first refresh color and the second refresh color of the first color region, and the color type of the second color region and a remaining first color region is determined as the second color region.

In this embodiment, the second color region may refer to a color region in which the color type is displayed without multiple refreshes, that is, the color type of the second color region is rendered through a single refresh.

The first refresh color of the first color region and the color type of the second color region may be combined to obtain one color group. In this case, the sum of the number of first refresh colors and the number of the color types of the second color region may be less than the number of single refreshes, indicating that the driver IC still has room to refresh more color types. In this case, part of the first color region may be configured to achieve the color refresh without multiple refreshes, and this part of the first color region is determined as the second color region.

The third color region may refer to the first color region in which the color type is rendered through multiple refreshes. In this manner, it is redefined that the color type of the second color region is displayed in color through a single refresh, and the color type of the third color region is displayed in color through multiple refreshes.

In an embodiment, according to the drive voltages of the color types of the color regions, the first refresh color and the second refresh color of the first color region, and the color type of the second color region, the first color region is filtered so as to obtain the third color region that requires multiple refreshes, the remaining first color region is determined as the second color region, and the second color region is rendered through a single refresh.

In an example, if the image is a five-color image, color 1 is gray 1, color 2 is gray 2, color 3 is gray 3, color 4 is gray 4, color 1, color 2, color 3, and color 4 all need the multi-color coincident refresh, and the first refresh colors are all white, then the region formed by color 1, color 2, color 3, and color 4 is the first color region, and the region where color 5 is located is the second color region in which the color type is rendered through a single refresh. The first refresh color of the first color region and the color type of the second color region are combined to obtain one color group. In this case, the sum of the number of first refresh colors and the number of the color types of the second color region is less than the number of single refreshes, indicating that the driver IC still has room to refresh more color types. In this case, part of the first color region may be configured to achieve the color refresh without multiple refreshes, and this part of the first color region is determined as the second color region. For example, color 1, color 2, and color 3 are configured to achieve the color refresh without multiple refreshes, and this part of the first color region is determined as the second color region. Then, the third color region is the first color region in which the color type is rendered through multiple refreshes, that is, the color region where color 4 is located.

In S1209, the third color region and the second color region are determined as a first color group and the color type of the third color region in the first color group is updated to the first refresh color.

Normally, after S1208 in FIG. 12A is performed, S1209 in FIG. 12B is performed. In this embodiment, the first color group includes all color regions. The refresh process corresponding to the first color group is the global refresh. The first color group includes the third color region and the second color region. In the first color group, the third color region corresponds to the first refresh color, and the second color region corresponds to the color type.

In an embodiment, the third color region and the second color region are determined as the first color group, the color regions of the first color group are refreshed simultaneously, and the color type of the third color region in the first color group is updated to the first refresh color, that is, the color type of the third color region in the first color group is updated to the first refreshed color that requires the multi-color coincident refresh.

In an example, as shown in an embodiment in step S1208, the third color region and the second color region are determined as the first color group, the color type of the third color region is gray 4, the first refresh color for the multi-color coincident refresh in the third color region is white, and the color type in the color region where color 4 in the first color group is located is updated to white.

In S1210, the third color region is divided to obtain at least one second color group and the color type of the third color region in the second color group is updated to the second refresh color.

In this embodiment, the second color group includes only the third color region, and the third color region corresponds to the second refresh color. At least one second color group may be provided.

In an embodiment, the third color region and the color region that requires the multi-color coincident refresh are divided so as to obtain at least one second color group, and the color type of the third color region in the second color group is updated to the second refresh color until all color regions in the multi-color image are refreshed to the target colors.

In S1211, the color types included in the first color group and the color regions corresponding to the color types included in the first color group are determined as first refresh image data and a first refresh instruction corresponding to the first refresh image data, where the first refresh instruction is a global refresh instruction.

In an embodiment, according to the encoding rule, the color types included in the first color group and the color regions corresponding to the color types included in the first color group are determined as the first refresh image data and the first refresh instruction corresponding to the first refresh image data, and the targeted refresh instruction operation is performed for the refresh image data, where the first refresh instruction is the global refresh instruction.

In an example, as shown in FIGS. 14A and 14B, the first color group and the second color group corresponding to the seven-color image are shown. FIG. 14A shows the first color group, and the first color group includes color 11, color 12, color 13, and color 14. FIG. 14B shows the second color group, and the second color group includes color 21, color 22, color 23, and color 24, where color 24 is colorless.

As can be seen from FIG. 14A, the correspondence between the first color group and the seven-color image is as follows: color 11 corresponds to color 2, and region 11 corresponds to region 1, region 2, region 5, and region 6 and is coded as 00; color 12 corresponds to color 3, and region 12 corresponds to region 3 and is coded as 01; color 13 corresponds to color 4, and region 13 corresponds to region 4 and is coded as 10; and color 14 corresponds to color 7, and region 14 corresponds to region 7 and is coded as 11. The black, white, yellow, and red electronic paper screen is used as an example, where the seven colors may be as follows: color 1 is black, color 2 is white, color 3 is yellow, color 4 is red, color 5 is gray 1, color 6 is gray 2, and color 7 is orange. Then, color 11 is white like color 2, color 12 is yellow like color 3, color 13 is red like color 4, and color 14 is orange like color 7. Similarly, region 11 is a set of four regions: region 1, region 2, region 5, and region 6, region 12 and region 3 are the same region, region 13 and region 4 are the same region, and region 14 and region 7 are the same region. It can be seen from this that the first refresh image is obtained by adjusting the three colors of black, gray 1, and gray 2 in the seven-color image to colorless. At the same time, according to the encoding rule, the first refresh image data corresponding to the seven-color image is obtained.

For the first refresh, the refresh image is the first refresh image, the number of refreshes is the first refresh, and the refresh instruction is the global refresh. The global refresh includes three stages: the charge balance stage, the activation stage, and the color rendering stage. The duration required for the charge balance stage is T11, the duration required for the activation stage is T12, the duration required for the color rendering stage is T13, and the duration required for a single refresh is T11+T12+T13.

In S1212, the color types included in the second color group and the color regions corresponding to the color types included in the second color group are determined as second refresh image data and a second refresh instruction corresponding to the second refresh image data, where the second refresh instruction is a partial refresh instruction; and the first refresh instruction is executed before the second refresh instruction.

In an example, as can be seen from FIG. 14B, the correspondence between the second color group and the seven-color image is as follows: color 21 corresponds to color 1, and region 21 corresponds to region 1 and is coded as 00; color 22 corresponds to color 5, and region 22 corresponds to region 5 and is coded as 01; color 23 corresponds to color 6, and region 23 corresponds to region 6 and is coded as 10; and color 24 corresponds to color 2, color 3, color 4, and color 7, region 24 corresponds to region 2, region 3, region 4, and region 7 and is coded as 11, the pixels in region 21, region 22, and region 23 corresponding to color 21, color 22, and color 23 in the second color group need to be refreshed, and the pixels in region 24 corresponding to color 24 do not need to be refreshed. In this manner, for the pixels that need to be refreshed, the driving waveform is adjusted according to the encoding rule so as to refresh the corresponding color. For the pixels that do not need to be refreshed, the driving waveform of the code of region 24 is configured to be consistent with the output reference voltage VCOM of the display panel. VCOM is a preset voltage threshold, and VCOM may be an unfixed voltage threshold. The code of region 24 is used as a protection code, the drive voltage for driving the movement of electronic ink in the pixel is always zero, and the pixels remain stationary during the refresh process of the electronic paper screen so that the purpose of protecting the pixels from being refreshed can be achieved, the color of the region corresponding to the protection code is colorless, and then the color of region 24 corresponding to color 24 is colorless. The black, white, yellow, and red electronic paper screen is used as an example, where the seven colors may be as follows: color 1 is black, color 2 is white, color 3 is yellow, color 4 is red, color 5 is gray 1, color 6 is gray 2, and color 7 is orange. Then, color 21 is black like color 1, color 22 is gray 1 like color 5, color 23 is gray 2 like color 6, and color 24 is colorless. Similarly, region 21 and region 1 are the same region, region 22 and region 5 are the same region, region 23 and region 6 are the same region, and region 24 is a set of four regions: region 2, region 3, region 4, and region 7. It can be seen from this that the second refresh image is obtained by adjusting the four colors of white, yellow, red, and orange in the seven-color image to colorless. At the same time, according to the encoding rule, the second refresh image data corresponding to the seven-color image is obtained.

For the second refresh, the refresh image is the second refresh image, the number of refreshes is the second refresh, and the refresh instruction is the partial fast refresh for any position. One partial fast refresh for any position includes two stages: the charge balance stage and the color rendering stage. The duration required for the charge balance stage is T21, the duration required for the color rendering stage is T23, and the duration required for a single refresh is T21+T23. Moreover, the first refresh instruction is executed before the second refresh instruction.

In S1213, the refresh instructions and the multiple pieces of refresh image data are sent to a controller of an electronic paper screen so that the controller refreshes the display content of the electronic paper screen based on the refresh instructions and the corresponding multiple pieces of refresh image data.

In the technical solution of the embodiment of the present disclosure, through the first refresh (the global refresh), in conjunction with at least one subsequent partial refresh, the color region that may be split for color rendering is refreshed multiple times so that the number of refreshed colors in a single refresh can be increased, the number of refreshes can be reduced, the refresh speed can be improved, and the refresh time can be reduced. Moreover, the multi-color display of the electronic paper screen can be achieved and the number of displayed colors can be increased.

In an embodiment, the first refresh instruction is executed before the second refresh instruction, the first refresh instruction is used for the controller to refresh the display content of the electronic paper screen through a charge balance stage, an activation stage, and a color rendering stage, and the second refresh instruction is used for the controller to refresh the display content of the electronic paper screen through charge balance stage and the color rendering stage.

The first refresh instruction is the global refresh instruction, the second refresh instruction is the partial refresh instruction, and the first refresh instruction is executed before the second refresh instruction. Moreover, the first refresh color refreshed in the third color region in the first refresh instruction needs to be mixed with the second refresh color refreshed in the third color region in the second refresh instruction. In this case, in the first refresh instruction, the global pixels have already passed the activation stage. Therefore, in the subsequent second refresh instruction, the global pixels do not need to repeat the activation stage.

Since the first refresh is the global refresh, each pixel in the screen has been activated during the first refresh process, and the activation stage may be omitted during the second refresh process, thereby reducing the refresh time and the refresh power consumption by using a fast refresh method.

In an embodiment, the polarity of the drive voltage corresponding to the first refresh color is opposite to the polarity of the drive voltage corresponding to the second refresh color, and the absolute value of the drive voltage corresponding to the first refresh color is less than the absolute value of the drive voltage corresponding to the second refresh color.

In this embodiment, the polarity may be positive or negative. For example, the polarity of the drive voltage corresponding to the first refresh color is positive, and the polarity of the drive voltage corresponding to the second refresh color is negative. For another example, the polarity of the drive voltage corresponding to the first refresh color is negative, and the polarity of the drive voltage corresponding to the second refresh color is positive.

The refreshed color types of the second refresh instruction are all second refresh colors, the drive voltages corresponding to the color types corresponding to the second refresh instruction are all large drive voltages, the small drive voltage is used for driving the color development only during the refresh process of the first refresh instruction, and the polarity of the drive voltage corresponding to the first refresh color is opposite to the polarity of the drive voltage corresponding to the second refresh color so that the first refresh instruction drives all the colors that are slow to be refreshed to complete the color development, and the second refresh instruction drives only the color that is the fastest to be refreshed, thereby improving the color refresh speed.

In addition, the polarity of the colored particles corresponding to the first refresh color is opposite to the polarity of the colored particles corresponding to the second refresh color. The absolute value of the charge-to-mass ratio of the colored particles corresponding to the first refresh color is different from the absolute value of the charge-to-mass ratio of the colored particles corresponding to the second refresh color.

In an example, the voltages from low to high correspond to five voltages: VSNH, VSNL, GND, VSPL, and VSPH. VSNH is a large negative voltage (usually −15 V), VSNL is a small negative voltage (usually −5 V), GND is the ground voltage (usually 0 V), VSPL is a small positive voltage (usually +5 V), and VSPH is a large positive voltage (usually +15 V). Different colored particles in the electronic paper film are designed to have different charge-to-mass ratios so that different drive voltages are used for effective driving. The four-color electronic paper film of black, white, yellow, and red is used as an example. The black particle is positively charged, has a relatively large charge-to-mass ratio, and corresponds to a large positive drive voltage VSPH; the white particle is negatively charged, has a relatively small charge-to-mass ratio, and corresponds to a small negative drive voltage VSNL; the yellow particle is negatively charged, has a relatively large charge-to-mass ratio, and corresponds to a large negative drive voltage VSNH; and the red particle is positively charged, has a relatively small charge-to-mass ratio, and corresponds to a small positive drive voltage VSPL. Therefore, VSNH corresponds to the drive voltage of the yellow particle, VSNL corresponds to the drive voltage of the white particle, VSPL corresponds to the drive voltage of the red particle, and VSPH corresponds to the drive voltage of the black particle. The refresh speed of a small drive voltage is slow, and the refresh speed of a large drive voltage is fast. The fast refresh method is used to reduce the refresh time.

The drive voltage of the third color region in the first refresh instruction is configured to be smaller and the drive voltage of the third color region in the second refresh instruction is configured to be larger so that the first refresh instruction drives all the colors that are slow to be refreshed to complete the color development, and the second refresh instruction drives only the color that is fastest to be refreshed, thereby improving the color refresh speed.

Figures 15A, 15B:
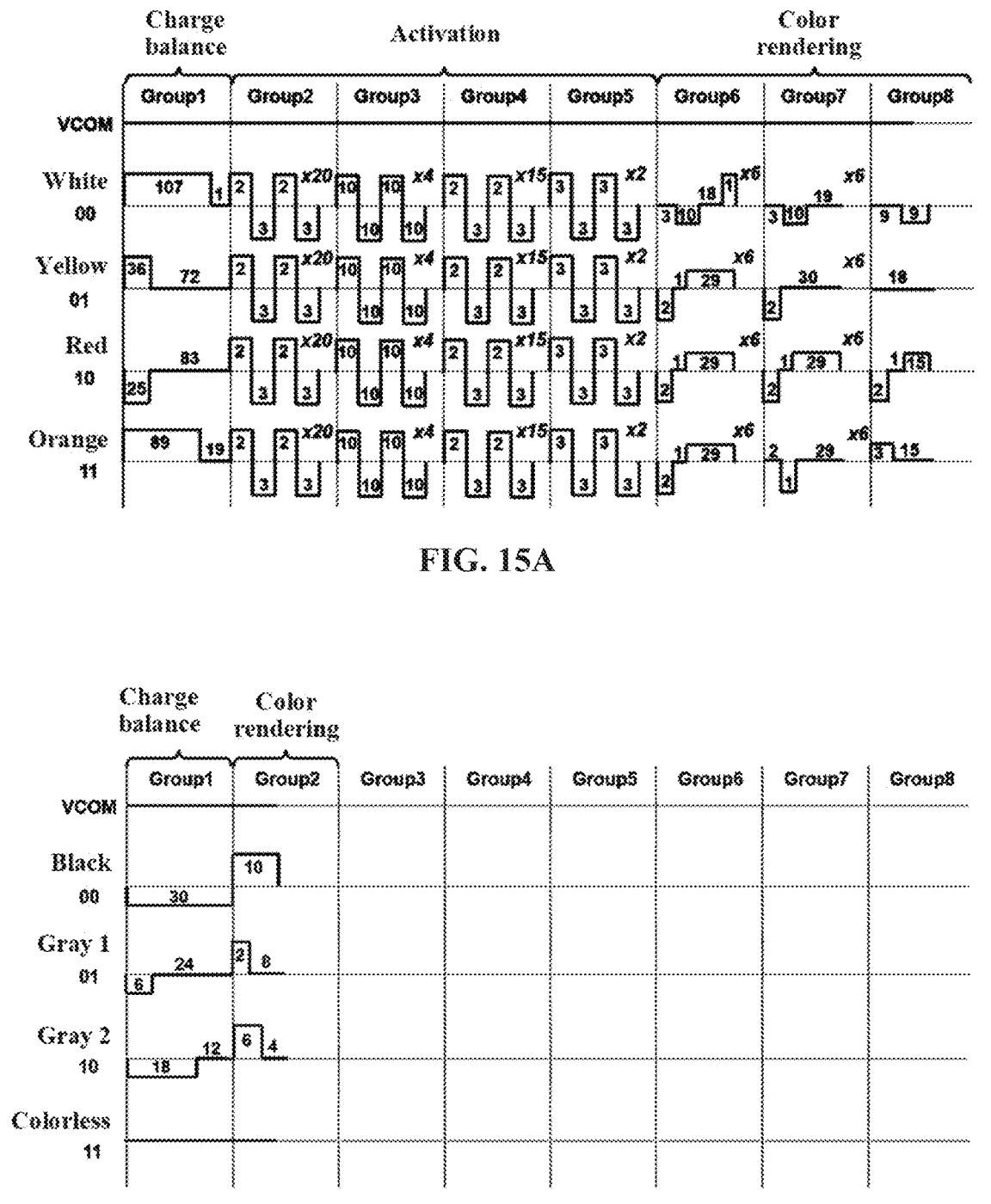

In an example, as shown in FIGS. 15A and 15B, the refresh process of the seven-color image is shown. Since the electronic paper screen using the 2-bit driver IC is able to only update up to four colors each time, the seven-color image is used as the target image, and the electronic paper screen needs to be refreshed twice.

For the first refresh, the refresh is performed based on the first refresh image data, the number of refreshes is the first refresh, and the refresh type is the global refresh. The global refresh includes three stages: the charge balance stage, the activation stage, and the color rendering stage. The duration required for the charge balance stage is T11, the duration required for the activation stage is T12, the duration required for the color rendering stage is T13, and the duration required for a single refresh is T11+T12+T13.

For the second refresh, the refresh is performed based on the second refresh image data, the number of refreshes is the second refresh, and the refresh type is the partial fast refresh for any position. One partial fast refresh for any position includes two stages: the charge balance stage and the color rendering stage. The duration required for the charge balance stage is T21, the duration required for the color rendering stage is T23, and the duration required for a single refresh is T21+T23. The seven-color image needs to be refreshed twice, and the total refresh duration is the sum of the durations of the two refreshes, that is, T11+T12+T13+T21+T23.

At room temperature, the time for one global refresh is about 20 s, and the time for one partial fast refresh for any location may be optimized to about 1 s. It can be seen from this that at room temperature, compared with one global refresh of the four-color image, the update time of the multi-color image is increased only by about 5% by using one global refresh and one partial fast refresh for any position. The update power consumption is basically proportional to the update time, so the update power consumption is increased only by about 5%. The global refresh is that all pixels on the screen are refreshed, and one global refresh includes three stages: charge balance, activation, and color rendering. The partial fast refresh for any position is to quickly refresh only the pixels on the screen corresponding to the position of the specific color in the target image. One partial fast refresh for any position includes two stages: charge balance and color rendering. In the charge balance stage, a reverse voltage is applied so that the total amount of positive charge is equal to the total amount of negative charge during the entire refresh process, thereby ensuring that there is no residual charge in the electronic paper film. In the activation stage, periodic +15 V or −15 V high and low voltages are applied so that various colored particles in the electronic paper film are mixed evenly. In the color rendering stage, a drive voltage and a driving waveform specific to each color are applied so that the colored particles in the electronic paper film are driven to render the desired color.

As shown in FIG. 15A, the first driving waveform corresponding to the first color region is shown. Since the first refresh is the global refresh, all pixels on the screen must be refreshed. Corresponding colors are refreshed by adjusting the driving waveforms of code 00, code 01, code 10, and code 11. As shown in FIG. 15B, the second driving waveform corresponding to the second color region is shown. The pixels in region 21, region 22, and region 23 corresponding to color 21, color 22, and color 23 need a second refresh, and the pixels in region 24 corresponding to color 24 do not need to be refreshed. Corresponding colors are refreshed by adjusting the driving waveforms of code 00, code 01, and code 10. Two refreshes are performed; in the first refresh, the regions corresponding to color 2, color 3, color 4, and color 7 in the seven-color image are refreshed, and the regions corresponding to color 1, color 5, and color 6 are refreshed to color 2; and in the second refresh, the regions corresponding to color 1, color 5, and color 6 in the seven-color image are refreshed, and the regions corresponding to color 2, color 3, color 4, and color 7 that have been refreshed are protected from being refreshed, thereby achieving the multi-color display of the electronic paper screen.

Embodiment Four

Figure 16:
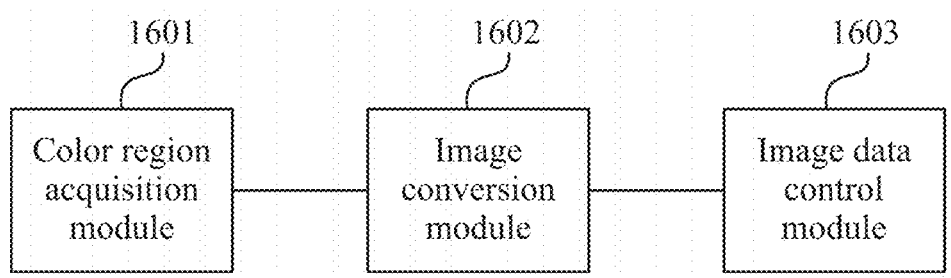
FIG. 16 is a structural diagram of a display content updating apparatus according to embodiment four of the present disclosure.

FIG. 16 is a structural diagram of a display content updating apparatus according to embodiment four of the present disclosure. The embodiment of the present disclosure can be applied to the case of updating the display content. This apparatus may perform the display content updating method. This apparatus may be implemented in the form of hardware and/or software. This apparatus may be configured in a vehicle.

Referring to the display content updating apparatus shown in FIG. 16, the display content updating apparatus includes a color region acquisition module 1601, an image conversion module 1602, and an image data control module 1603.

The color region acquisition module 1601 is configured to acquire a color region included in a multi-color image and a color type corresponding to the color region.

The image conversion module 1602 is configured to, convert, according to positions and color types of color regions in the multi-color image, the multi-color image into multiple pieces of refresh image data and refresh instructions corresponding to the multiple pieces of refresh image data, where different refresh instructions are executed asynchronously.

The image data control module 1603 is configured to send the refresh instructions and the multiple pieces of refresh image data to a controller of an electronic paper screen so that the controller refreshes the display content of the electronic paper screen based on the refresh instructions and the corresponding multiple pieces of refresh image data.

In the technical solutions of the embodiment of the present disclosure, a color region included in a multi-color image and a color type corresponding to the color region are acquired, facilitating targeted operations on different color regions and color types corresponding to different color regions; the multi-color image is converted into multiple pieces of refresh image data and refresh instructions corresponding to the multiple pieces of refresh image data according to positions and color types of color regions in the multi-color image, where different refresh instructions are executed asynchronously; corresponding refresh instructions are executed for different refresh image data, improving the accuracy of targeted operations on the refresh image data; the refresh instructions and the multiple pieces of refresh image data are sent to a controller of an electronic paper screen so that the controller refreshes the display content of the electronic paper screen based on the refresh instructions and the corresponding multiple pieces of refresh image data, implementing that the controller uses targeted refresh instructions for the refresh image data and performs corresponding operations on the electronic paper screen according to the refresh instructions, thereby improving the efficiency and accuracy of image data processing.

In an embodiment, the image conversion module 1602 includes a color counting unit, a refresh quantity counting unit, a refresh number detection unit, and a refresh instruction determination unit.

The color counting unit is configured to count the number of color types.

The refresh number counting unit is configured to calculate the number of single refreshes according to the number of bits of a driver IC.

The refresh number detection unit is configured to detect the number of refreshes according to the number of color types and the number of single refreshes.

The refresh instruction determination unit is configured to determine the multiple pieces of refresh image data and the refresh instructions corresponding to the multiple pieces of refresh image data according to the number of color types, the number of refreshes, and the positions and the color types of the color regions.

In an embodiment, the refresh instruction determination unit includes a color group determination subunit and a refresh instruction detection subunit.

The color group determination subunit is configured to group the color regions in the multi-color image according to the color types of the color regions in the multi-color image to obtain color groups with the number of refreshes, where the number of the color types included in each color group is less than or equal to the number of single refreshes.

The refresh instruction detection subunit is configured to, determine, according to the color regions included in the color groups and the color types corresponding to the color regions included in the color groups, the multiple pieces of refresh image data and the refresh instructions corresponding to the multiple pieces of refresh image data.

In an embodiment, the color group determination subunit is specifically configured to perform the steps described below.

A first color region whose color type belongs to the multi-color coincident refresh is acquired and a remaining color region is determined as a second color region.

Color types of colored particles driven by the driver IC and drive voltages corresponding to the colored particles are acquired and drive voltages corresponding to the color types of the color regions in the multi-color image are determined.

A first refresh color and a second refresh color of the first color region are acquired, where the first refresh color is refreshed before the second refresh color, and the first refresh color and the second refresh color are used for performing the coincident refresh on the same color region so that the color of the same color region is refreshed to obtain a target color.

The first color region is filtered to obtain a third color region according to the drive voltages of the color types of the color regions, the first refresh color and the second refresh color of the first color region, and the color type of the second color region and a remaining first color region is determined as the second color region.

The third color region and the second color region are determined as a first color group and the color type of the third color region in the first color group is updated to the first refresh color.

The third color region is divided so as to obtain at least one second color group and the color type of the third color region in the second color group is updated to the second refresh color.

The refresh instruction detection subunit is configured to perform the steps described below.

The color types included in the first color group and the color regions corresponding to the color types included in the first color group are determined as first refresh image data and a first refresh instruction corresponding to the first refresh image data, where the first refresh instruction is a global refresh instruction.

The color types included in the second color group and the color regions corresponding to the color types included in the second color group are determined as second refresh image data and a second refresh instruction corresponding to the second refresh image data, where the second refresh instruction is a partial refresh instruction; and the first refresh instruction is executed before the second refresh instruction.

In an embodiment, the first refresh instruction is executed before the second refresh instruction, the first refresh instruction is used for the controller to refresh the display content of the electronic paper screen through a charge balance stage, an activation stage, and a color rendering stage, and the second refresh instruction is used for the controller to refresh the display content of the electronic paper screen through the charge balance stage and the color rendering stage.

In an embodiment, the drive voltage corresponding to the first refresh color is less than the drive voltage corresponding to the second refresh color.

In an embodiment, the refresh instruction detection subunit is specifically configured to perform the steps described below.

The color types included in the color group and the color regions corresponding to the color types included in the color group are determined as a piece of refresh image data and a refresh instruction corresponding to the piece of refresh image data, where the refresh instruction is a partial refresh instruction.

Alternatively, among multiple color groups, a color group including the largest number of color types is determined as a third color group and a remaining color group is determined as a fourth color group.

A color type of a color region other than a color region included in the third color group is updated to a color type included in the third color group and the color type of the color region other than the color region included in the third color group is added to the third color group.

The color types included in the third color group after the addition and the color regions corresponding to the color types included in the third color group are determined as third refresh image data and a third refresh instruction corresponding to the third refresh image data, where the third refresh instruction is a global refresh instruction.

The color types included in the fourth color group and the color regions corresponding to the color types included in the fourth color group are determined as fourth refresh image data and a fourth refresh instruction corresponding to the fourth refresh image data, where the fourth refresh instruction is a partial refresh instruction; and the third refresh instruction is executed before the fourth refresh instruction.

The display content updating apparatus provided in the embodiment of the present disclosure can perform the display content updating method according to any embodiment of the present disclosure and has functional modules and beneficial effects corresponding to the executed display content updating method.

Embodiment Five

Figure 17:
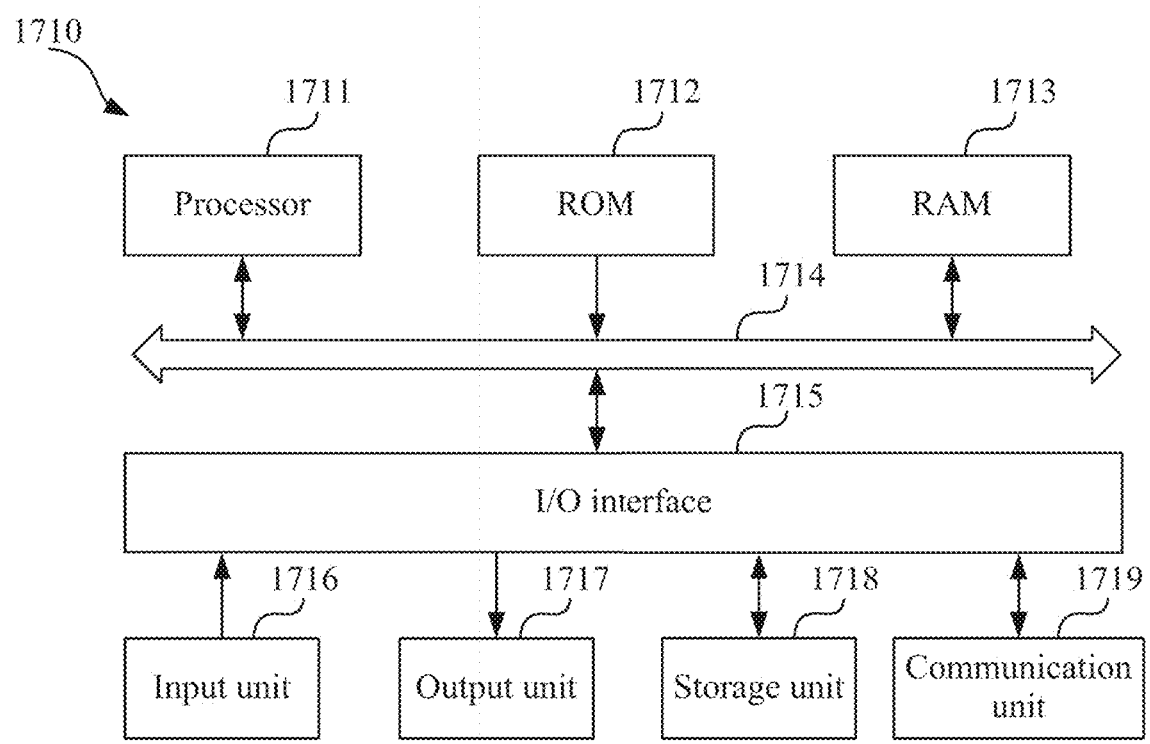
FIG. 17 is a schematic diagram of a display content updating device according to embodiment five of the present disclosure.

FIG. 17 is a structural diagram of a display content updating device 1710 for implementing the embodiments of the present disclosure.

As shown in FIG. 17, the display content updating device 1710 includes at least one processor 1711 and a memory (such as a read-only memory (ROM) 1712 and a random-access memory (RAM) 1713) communicatively connected to the at least one processor 1711. The memory stores a computer program executable by the at least one processor, and the processor 1711 may perform various types of appropriate operations and processing according to the computer program stored in the ROM 1712 or the computer program loaded from a storage unit 1718 to the RAM 1713. Various programs and data required for the operation of the display content updating device 1710 may also be stored in the RAM 1713. The processor 1711, the ROM 1712, and the RAM 1713 are connected to each other through a bus 1714. An input/output (I/O) interface 1715 is also connected to the bus 1714.

Multiple components in the display content updating device 1710 are connected to the I/O interface 1715. The multiple components include an input unit 1716 such as a keyboard or a mouse, an output unit 1717 such as various types of displays or speakers, the storage unit 1718 such as a magnetic disk or an optical disc, and a communication unit 1719 such as a network card, a modem, or a wireless communication transceiver. The communication unit 1719 allows the display content updating device 1710 to exchange information/data with other devices over a computer network such as the Internet and/or over various telecommunication networks.

The processors 1711 may be various general-purpose and/or special-purpose processing assemblies having processing and computing capabilities. Examples of the processor 1711 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller, or microcontroller. The processor 1711 performs various preceding methods and processing, such as the display content updating method.

In some embodiments, the display content updating method may be implemented as computer programs tangibly contained in a computer-readable storage medium such as the storage unit 1718. In some embodiments, part or all of the computer programs may be loaded and/or installed onto the display content updating device 1710 via the ROM 1712 and/or the communication unit 1719. When the computer programs are loaded to the RAM 1714 and executed by the processor 1711, one or more steps of the preceding display content updating method may be performed. Alternatively, in other embodiments, the processor 1711 may be configured, in any other suitable manner (for example, by means of firmware), to perform the display content updating method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a storage system, at least one input apparatus, and at least one output apparatus and transmitting the data and instructions to the storage system, the at least one input apparatus, and the at least one output apparatus.

Computer programs for implementation of the methods of the present disclosure may be written in one programming language or any combination of multiple programming languages. These computer programs may be provided for a processor of a general-purpose computer, a special-purpose computer, or another programmable data processing apparatus so that the computer programs, when executed by the processor, cause functions/operations specified in the flowcharts and/or block diagrams to be implemented. These computer programs may be executed entirely on a machine, partly on a machine, as a stand-alone software package partly on a machine and partly on a remote machine, or entirely on a remote machine or a server.

In the context of the present disclosure, the computer-readable storage medium may be a tangible medium including or storing a computer program that is used by or used in conjunction with an instruction execution system, apparatus, or device. The computer-readable storage medium may include, but is not limited to, an electronic, magnetic, optical, electromagnetic, infrared, or semiconductor system, apparatus, or device or any appropriate combination thereof. Alternatively, the computer-readable storage medium may be a machine-readable signal medium. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on the display content updating device. The display content updating device has a display apparatus (for example, a cathode-ray tube (CRT) or a liquid-crystal display (LCD) monitor) for displaying information to the user; and a keyboard and a pointing apparatus (for example, a mouse or a trackball) through which the user can provide input for the display content updating device. Other types of apparatuses may also be used for providing interaction with a user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a user computer having a graphical user interface or a web browser through which a user can interact with embodiments of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services.

It is to be understood that various forms of the preceding flows may be used with steps reordered, added, or deleted. For example, the steps described in the present disclosure may be performed in parallel, in sequence, or in a different order as long as the desired result of the technical solutions provided in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement, and the like made within the spirit and principle of the present disclosure fall within the scope of the present disclosure.

What is claimed is:

1. A display content updating method, comprising:
    acquiring a color region comprised in a multi-color image and a color type corresponding to the color region;
    converting, according to positions and color types of color regions in the multi-color image, the multi-color image into a plurality of pieces of refresh image data and refresh instructions corresponding to the plurality of pieces of refresh image data, wherein different refresh instructions are executed asynchronously; and
    sending the refresh instructions and the plurality of pieces of refresh image data to a controller of an electronic paper screen so that the controller refreshes display content of the electronic paper screen based on the refresh instructions and the corresponding plurality of pieces of refresh image data;
    wherein converting, according to the positions and the color types of the color regions in the multi-color image, the multi-color image into the plurality of pieces of refresh image data and the refresh instructions corresponding to the plurality of pieces of refresh image data comprises:
    determining a number of the color types of the color regions in the multi-color image;
    determining, according to a number of bits of a driver integrated circuit (IC) of the electronic paper screen, a maximum number of color regions refreshed by the driver IC for one time;
    determining a number of refreshing times according to the number of the color types and the maximum number of color regions refreshed by the driver IC for one time; and
    determining, according to the number of the color types, the number of refreshing times, and the positions and the color types of the color regions, the plurality of pieces of refresh image data and the refresh instructions corresponding to the plurality of pieces of refresh image data.

2. The display content updating method of claim 1, wherein determining the plurality of pieces of refresh image data and the refresh instructions corresponding to the plurality of pieces of refresh image data according to the number of the color types, the number of refreshing times, and the positions and the color types of the color regions comprises:
    grouping the color regions in the multi-color image according to the color types of the color regions in the multi-color image to obtain color groups with the number of refreshing times, wherein the number of the color types comprised in a color group of the color groups is less than or equal to the maximum number of color regions refreshed by the driver IC for one time; and
    determining, according to the color regions comprised in the color groups and the color types corresponding to the color regions comprised in the color groups, the plurality of pieces of refresh image data and the refresh instructions corresponding to the plurality of pieces of refresh image data.

3. The display content updating method of claim 2, wherein grouping the color regions in the multi-color image according to the color types of the color regions in the multi-color image to obtain the color groups with the number of refreshing times comprises:
    acquiring a first color region whose color type belongs to a multi-color coincident refresh and determining a remaining color region as a second color region;
    acquiring color types of colored particles driven by the driver IC and drive voltages corresponding to the colored particles and determining drive voltages corresponding to the color types of the color regions in the multi-color image;
    acquiring a first refresh color and a second refresh color of the first color region, wherein the first refresh color is refreshed before the second refresh color, and the first refresh color and the second refresh color are used for performing a coincident refresh on a same color region so that a color of the same color region is refreshed to obtain a target color;
    filtering the first color region to obtain a third color region according to the drive voltages of the color types of the color regions, the first refresh color and the second refresh color of the first color region, and a color type of the second color region and determining a remaining first color region as the second color region;

determining the third color region and the second color region as a first color group and updating a color type of the third color region in the first color group to the first refresh color; and dividing the third color region to obtain at least one second color group and updating the color type of the third color region in a second color group of the at least one second color group to the second refresh color.

4. The display content updating method of claim 2, wherein determining, according to the color regions comprised in the color groups and the color types corresponding to the color regions included in the color groups, the plurality of pieces of refresh image data and the refresh instructions corresponding to the plurality of pieces of refresh image data comprises:

determining the color types comprised in the first color group and the color regions corresponding to the color types comprised in the first color group as first refresh image data and a first refresh instruction corresponding to the first refresh image data, wherein the first refresh instruction is a global refresh instruction; and determining the color types comprised in the second color group and the color regions corresponding to the color types comprised in the second color group as second refresh image data and a second refresh instruction corresponding to the second refresh image data, wherein the second refresh instruction is a partial refresh instruction; and the first refresh instruction is executed before the second refresh instruction.

5. The display content updating method of claim 4, wherein the first refresh instruction is executed before the second refresh instruction, the first refresh instruction is used for the controller to refresh the display content of the electronic paper screen through a charge balance stage, an activation stage, and a color rendering stage, and the second refresh instruction is used for the controller to refresh the display content of the electronic paper screen through the charge balance stage and the color rendering stage.

6. The display content updating method of claim 3, wherein a polarity of a drive voltage corresponding to the first refresh color is opposite to a polarity of a drive voltage corresponding to the second refresh color, and an absolute value of the drive voltage corresponding to the first refresh color is less than an absolute value of the drive voltage corresponding to the second refresh color.

7. The display content updating method of claim 2, wherein determining, according to the color regions comprised in the color groups and the color types corresponding to the comprised color regions, the plurality of pieces of refresh image data and the refresh instructions corresponding to the plurality of pieces of refresh image data comprises:

determining the color types comprised in the color group and the color regions corresponding to the color types comprised in the color group as a piece of refresh image data and a refresh instruction corresponding to the piece of refresh image data, wherein the refresh instruction is a partial refresh instruction.

8. The display content updating method of claim 2, wherein determining, according to the color regions comprised in the color groups and the color types corresponding to the comprised color regions, the plurality of pieces of refresh image data and the refresh instructions corresponding to the plurality of pieces of refresh image data comprises:

among a plurality of color groups, determining a color group comprising a largest number of color types as a third color group and determining a remaining color group as a fourth color group;

updating a color type of a color region other than a color region comprised in the third color group to a color type comprised in the third color group and adding the color type of the color region other than the color region comprised in the third color group to the third color group;

determining color types comprised in the third color group after the addition and color regions corresponding to the color types comprised in the third color group as third refresh image data and a third refresh instruction corresponding to the third refresh image data, wherein the third refresh instruction is a global refresh instruction; and determining color types comprised in the fourth color group and color regions corresponding to the color types comprised in the fourth color group as fourth refresh image data and a fourth refresh instruction corresponding to the fourth refresh image data, wherein the fourth refresh instruction is the partial refresh instruction; and the third refresh instruction is executed before the fourth refresh instruction.

9. A display content updating device, comprising:

at least one processor; and a memory communicatively connected to the at least one processor; wherein the memory stores a computer program executable by the at least one processor to cause the at least one processor to perform:

acquiring a color region comprised in a multi-color image and a color type corresponding to the color region; and converting, according to positions and color types of color regions in the multi-color image, the multi-color image into a plurality of pieces of refresh image data and refresh instructions corresponding to the plurality of pieces of refresh image data, wherein different refresh instructions are executed asynchronously; and sending the refresh instructions and the plurality of pieces of refresh image data to a controller of an electronic paper screen so that the controller refreshes display content of the electronic paper screen based on the refresh instructions and the corresponding plurality of pieces of refresh image data:

wherein the at least one processor is caused to convert, according to the positions and the color types of the color regions in the multi-color image, the multi-color image into the plurality of pieces of refresh image data and the refresh instructions corresponding to the plurality of pieces of refresh image data in the following manners:

determining a number of the color types of the color regions in the multi-color image;

determining, according to a number of bits of a driver integrated circuit (IC) of the electronic paper screen, a maximum number of color regions refreshed by the driver IC for one time;

determining a number of refreshing times according to the number of the color types and the maximum number of color regions refreshed by the driver IC for one time; and determining, according to the number of the color types, the number of refreshing times, and the positions and the color types of the color regions, the plurality of pieces of refresh image data and the refresh instructions corresponding to the plurality of pieces of refresh image data.

10. The display content updating device of claim 9, wherein at least one processor is caused to determine the plurality of pieces of refresh image data and the refresh instructions corresponding to the plurality of pieces of refresh image data according to the number of the color types, the number of refreshing times, and the positions and the color types of the color regions in the following manners:
grouping the color regions in the multi-color image according to the color types of the color regions in the multi-color image to obtain color groups with the number of refreshing times, wherein the number of the color types comprised in a color group of the color groups is less than or equal to the maximum number of color regions refreshed by the driver IC for one time; and
determining, according to the color regions comprised in the color groups and the color types corresponding to the color regions comprised in the color groups, the plurality of pieces of refresh image data and the refresh instructions corresponding to the plurality of pieces of refresh image data.

11. The display content updating device of claim 10, wherein the at least one processor is caused to group the color regions in the multi-color image according to the color types of the color regions in the multi-color image to obtain the color groups with the number of refreshing times in the following manners:
acquiring a first color region whose color type belongs to a multi-color coincident refresh and determining a remaining color region as a second color region;
acquiring color types of colored particles driven by the driver IC and drive voltages corresponding to the colored particles and determining drive voltages corresponding to the color types of the color regions in the multi-color image;
acquiring a first refresh color and a second refresh color of the first color region, wherein the first refresh color is refreshed before the second refresh color, and the first refresh color and the second refresh color are used for performing a coincident refresh on a same color region so that a color of the same color region is refreshed to obtain a target color;
filtering the first color region to obtain a third color region according to the drive voltages of the color types of the color regions, the first refresh color and the second refresh color of the first color region, and a color type of the second color region and determining a remaining first color region as the second color region;
determining the third color region and the second color region as a first color group and updating a color type of the third color region in the first color group to the first refresh color; and
dividing the third color region to obtain at least one second color group and updating the color type of the third color region in a second color group of the at least one second color group to the second refresh color.

12. The display content updating device of claim 10, wherein the at least one processor is caused to determine, according to the color regions comprised in the color groups and the color types corresponding to the color regions included in the color groups, the plurality of pieces of refresh image data and the refresh instructions corresponding to the plurality of pieces of refresh image data in the following manners:
determining the color types comprised in the first color group and the color regions corresponding to the color types comprised in the first color group as first refresh image data and a first refresh instruction corresponding to the first refresh image data, wherein the first refresh instruction is a global refresh instruction; and
determining the color types comprised in the second color group and the color regions corresponding to the color types comprised in the second color group as second refresh image data and a second refresh instruction corresponding to the second refresh image data, wherein the second refresh instruction is a partial refresh instruction; and the first refresh instruction is executed before the second refresh instruction.

13. The display content updating device of claim 12, wherein the first refresh instruction is executed before the second refresh instruction, the first refresh instruction is used for the controller to refresh the display content of the electronic paper screen through a charge balance stage, an activation stage, and a color rendering stage, and the second refresh instruction is used for the controller to refresh the display content of the electronic paper screen through the charge balance stage and the color rendering stage.

14. The display content updating device of claim 11, wherein a polarity of a drive voltage corresponding to the first refresh color is opposite to a polarity of a drive voltage corresponding to the second refresh color, and an absolute value of the drive voltage corresponding to the first refresh color is less than an absolute value of the drive voltage corresponding to the second refresh color.

15. The display content updating device of claim 10, wherein the at least one processor is caused to determine, according to the color regions comprised in the color groups and the color types corresponding to the comprised color regions, the plurality of pieces of refresh image data and the refresh instructions corresponding to the plurality of pieces of refresh image data in the following manner:
determining the color types comprised in the color group and the color regions corresponding to the color types comprised in the color group as a piece of refresh image data and a refresh instruction corresponding to the piece of refresh image data, wherein the refresh instruction is a partial refresh instruction.

16. The display content updating device of claim 10, wherein the at least one processor is caused to determine, according to the color regions comprised in the color groups and the color types corresponding to the comprised color regions, the plurality of pieces of refresh image data and the refresh instructions corresponding to the plurality of pieces of refresh image data in the following manners:
among a plurality of color groups, determining a color group comprising a largest number of color types as a third color group and determining a remaining color group as a fourth color group;
updating a color type of a color region other than a color region comprised in the third color group to a color type comprised in the third color group and adding the color type of the color region other than the color region comprised in the third color group to the third color group;
determining color types comprised in the third color group after the addition and color regions corresponding to the color types comprised in the third color group as third refresh image data and a third refresh instruction corresponding to the third refresh image data, wherein the third refresh instruction is a global refresh instruction; and
determining color types comprised in the fourth color group and color regions corresponding to the color types comprised in the fourth color group as fourth refresh image data and a fourth refresh instruction corresponding to the fourth refresh image data, wherein the fourth refresh instruction is the partial refresh instruction; and the third refresh instruction is executed before the fourth refresh instruction.

17. A non-transitory computer-readable storage medium, which is configured to store computer instructions which, when executed by a processor, implement:
  acquiring a color region comprised in a multi-color image and a color type corresponding to the color region;
  converting, according to positions and color types of color regions in the multi-color image, the multi-color image into a plurality of pieces of refresh image data and refresh instructions corresponding to the plurality of pieces of refresh image data, wherein different refresh instructions are executed asynchronously; and
  sending the refresh instructions and the plurality of pieces of refresh image data to a controller of an electronic paper screen so that the controller refreshes display content of the electronic paper screen based on the refresh instructions and the corresponding plurality of pieces of refresh image data;
  wherein converting, according to the positions and the color types of the color regions in the multi-color image, the multi-color image into the plurality of pieces of refresh image data and the refresh instructions corresponding to the plurality of pieces of refresh image data comprises:
  determining a number of the color types of the color regions in the multi-color image;
  determining, according to a number of bits of a driver integrated circuit (IC) of the electronic paper screen, a maximum number of color regions refreshed by the driver IC for one time;
  determining a number of refreshing times according to the number of the color types and the maximum number of color regions refreshed by the driver IC for one time; and
  determining, according to the number of the color types, the number of refreshing times, and the positions and the color types of the color regions, the plurality of pieces of refresh image data and the refresh instructions corresponding to the plurality of pieces of refresh image data.

18. The non-transitory computer-readable storage medium of claim 17, wherein the computer instructions, when executed by the processor, implement:
  grouping the color regions in the multi-color image according to the color types of the color regions in the multi-color image to obtain color groups with the number of refreshing times, wherein the number of the color types comprised in a color group of the color groups is less than or equal to the maximum number of color regions refreshed by the driver IC for one time; and
  determining, according to the color regions comprised in the color groups and the color types corresponding to the color regions comprised in the color groups, the plurality of pieces of refresh image data and the refresh instructions corresponding to the plurality of pieces of refresh image data.

19. The non-transitory computer-readable storage medium of claim 18, wherein the computer instructions, when executed by the processor, implement:
  acquiring a first color region whose color type belongs to a multi-color coincident refresh and determining a remaining color region as a second color region;
  acquiring color types of colored particles driven by the driver IC and drive voltages corresponding to the colored particles and determining drive voltages corresponding to the color types of the color regions in the multi-color image;
  acquiring a first refresh color and a second refresh color of the first color region, wherein the first refresh color is refreshed before the second refresh color, and the first refresh color and the second refresh color are used for performing a coincident refresh on a same color region so that a color of the same color region is refreshed to obtain a target color;
  filtering the first color region to obtain a third color region according to the drive voltages of the color types of the color regions, the first refresh color and the second refresh color of the first color region, and a color type of the second color region and determining a remaining first color region as the second color region;
  determining the third color region and the second color region as a first color group and updating a color type of the third color region in the first color group to the first refresh color; and
  dividing the third color region to obtain at least one second color group and updating the color type of the third color region in a second color group of the at least one second color group to the second refresh color.

20. The non-transitory computer-readable storage medium of claim 18, wherein the computer instructions, when executed by the processor, cause the processor to perform:
  determining the color types comprised in the first color group and the color regions corresponding to the color types comprised in the first color group as first refresh image data and a first refresh instruction corresponding to the first refresh image data, wherein the first refresh instruction is a global refresh instruction; and
  determining the color types comprised in the second color group and the color regions corresponding to the color types comprised in the second color group as second refresh image data and a second refresh instruction corresponding to the second refresh image data, wherein the second refresh instruction is a partial refresh instruction; and the first refresh instruction is executed before the second refresh instruction.

* * * * *